US009140775B2

(12) United States Patent
Mueck et al.

(10) Patent No.: US 9,140,775 B2
(45) Date of Patent: Sep. 22, 2015

(54) METHODS AND APPARATUS FOR RESOLVING WIRELESS SIGNAL COMPONENTS

(75) Inventors: Markus Mueck, Unterhaching (DE); Martin Hans, Salzdefurth (DE); Maik Bienas, Braunschweig (DE); Andreas Schmidt, Braunschweig (DE)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 13/356,518

(22) Filed: Jan. 23, 2012

(65) Prior Publication Data

US 2012/0120938 A1    May 17, 2012

Related U.S. Application Data

(63) Continuation of application No. 12/286,646, filed on Sep. 30, 2008, now Pat. No. 8,103,287.

(51) Int. Cl.
*G01S 5/00*    (2006.01)

(52) U.S. Cl.
CPC ..................................... *G01S 5/0045* (2013.01)

(58) Field of Classification Search
CPC ..... H04W 4/02; H04W 4/025; H04W 72/042; H04W 52/0206; H04W 56/0015; H04W 64/00; H04W 64/003
USPC .......... 370/335, 336, 337, 338, 389; 455/3.03, 455/407, 408, 418, 422.1, 424, 425, 456.2, 455/456.5, 456.6
See application file for complete search history.

(56) References Cited

U.S. PATENT DOCUMENTS

| 6,011,974 | A | 1/2000 | Cedervall et al. | |
| 7,065,369 | B2 | 6/2006 | Tang | |
| 7,151,940 | B2 | 12/2006 | Diao | |
| 7,373,155 | B2 | 5/2008 | Duan | |
| 7,737,893 | B1 * | 6/2010 | Furman et al. ................ | 342/464 |
| 2002/0004398 | A1 * | 1/2002 | Ogino et al. .................. | 455/456 |
| 2002/0191554 | A1 * | 12/2002 | Kondo .......................... | 370/328 |
| 2004/0187162 | A1 * | 9/2004 | Wu et al. ...................... | 725/116 |

(Continued)

FOREIGN PATENT DOCUMENTS

| CN | 1791266 | 6/2006 |
| EP | 1 708 527 | 10/2006 |

(Continued)

*Primary Examiner* — Dinh P Nguyen
(74) *Attorney, Agent, or Firm* — Fay Kaplan & Marcin, LLP

(57) ABSTRACT

Methods and apparatus enabling a wireless network to generate data that can be used by a receiver (e.g., UE) to resolve the contributions of individual transmitters, such as to determine its location without resort to external devices such as GPS satellites. In one embodiment, the wireless network comprises a single frequency network (SFN), and a unique base station identifier is embedded within the data, and encoded in a manner which allows the UE to calculate path characteristics (such as path latency, and Direction of Arrival) to triangulate its position. In one variant, the data encoding comprises weighting frames of data from different base stations using an orthogonal matrix. Advantageously, the encoding and embedded identifier are also transparent to legacy UE, thereby allowing for implementation with no infrastructure or UE modifications other than software. Network and user apparatus implementing these methodologies, and methods of doing business, are also disclosed.

15 Claims, 15 Drawing Sheets

(56) References Cited

U.S. PATENT DOCUMENTS

| | | |
|---|---|---|
| 2004/0203904 A1 | 10/2004 | Gwon et al. |
| 2005/0148340 A1 | 7/2005 | Guyot |
| 2005/0186967 A1 | 8/2005 | Ozluturk |
| 2005/0226188 A1* | 10/2005 | Santhoff et al. ............... 370/335 |
| 2005/0266855 A1 | 12/2005 | Zeng et al. |
| 2006/0098600 A1* | 5/2006 | Cheng ........................... 370/335 |
| 2006/0189317 A1* | 8/2006 | Nakano ......................... 455/436 |
| 2006/0240843 A1 | 10/2006 | Spain et al. |
| 2007/0010210 A1* | 1/2007 | Singh et al. ..................... 455/73 |
| 2007/0089145 A1* | 4/2007 | Medford et al. ................ 725/81 |
| 2007/0202880 A1 | 8/2007 | Seo et al. |
| 2007/0225912 A1 | 9/2007 | Grush |
| 2007/0248068 A1* | 10/2007 | Onggosanusi et al. ....... 370/338 |
| 2008/0004042 A1 | 1/2008 | Dietrich et al. |
| 2008/0032705 A1 | 2/2008 | Patel et al. |
| 2008/0165883 A1* | 7/2008 | Jiang et al. ..................... 375/267 |
| 2009/0005083 A1* | 1/2009 | Hoshino et al. ............. 455/456.5 |
| 2010/0057485 A1 | 3/2010 | Luft |
| 2010/0177895 A1* | 7/2010 | Hong et al. .................... 380/270 |
| 2011/0116500 A1* | 5/2011 | Petry et al. .................... 370/389 |

FOREIGN PATENT DOCUMENTS

| | | |
|---|---|---|
| EP | 1 785 741 | 5/2007 |
| WO | WO 2007112696 | 4/2007 |

* cited by examiner $$M_2 = \begin{bmatrix} 1 & 1 \\ 1 & -1 \end{bmatrix} \text{—402}$$

$$M_{2n} = \begin{bmatrix} M_n & M_n \\ M_n & -M_n \end{bmatrix} \text{—404}$$

$$M_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \text{—406}$$

$$\begin{bmatrix} v_{tot,i} \\ v_{tot,i+1} \\ v_{tot,i+2} \\ v_{tot,i+3} \end{bmatrix} = \begin{bmatrix} m_{11} \cdot H_1 & m_{12} \cdot H_2 & \cdots & m_{14} \cdot H_4 \\ \vdots & \vdots & \ddots & \vdots \\ \cdots & \cdots & \cdots & \cdots \\ m_{41} \cdot H_1 & \cdots & \cdots & m_{44} \cdot H_4 \end{bmatrix} \cdot \begin{bmatrix} v_1 \\ v_2 \\ v_3 \\ v_4 \end{bmatrix} = (M \otimes I_U) \cdot \begin{bmatrix} H_1 v_1 \\ H_2 v_2 \\ H_3 v_3 \\ H_4 v_4 \end{bmatrix} \text{—408}$$

$$(M \otimes I_U)^H \begin{bmatrix} v_{tot,i} \\ v_{tot,i+1} \\ v_{tot,i+2} \\ v_{tot,i+3} \end{bmatrix} = N \cdot \begin{bmatrix} H_1 v_1 \\ H_2 v_2 \\ H_3 v_3 \\ H_4 v_4 \end{bmatrix} \text{—410}$$

FIG. 4A

METHODS AND APPARATUS FOR RESOLVING WIRELESS SIGNAL COMPONENTS

PRIORITY

This application is a continuation of and claims priority to co-owned co-pending U.S. patent application Ser. No. 12/286,646 filed, Sep. 30, 2008 and entitled "METHODS AND APPARATUS FOR RESOLVING WIRELESS SIGNAL COMPONENTS", incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication networks. More particularly, in one exemplary aspect, the present invention is directed to methods and apparatus for operation of a Single Frequency Network (SFN) using signal "shaping" to enable resolving individual signal components, such as for services including location determination.

2. Description of Related Technology

The Worldwide Interoperability for Microwave Access (WiMAX) technology is based on the IEEE 802.16 Standard, which is also commonly referred to as Wireless Metropolitan Area Network (WirelessMAN). WiMAX is within consideration for support of future evolution to fourth generation (4G) technology.

Current implementations of WiMAX (i.e., IEEE Std. 802.16e) are based on Scalable Orthogonal Frequency Domain Multiple Access (S-OFDMA), which can flexibly trade frequency and time resources for varying data requirements (such as high transmission robustness, high data throughput, low latency, etc.). The flexibility of S-OFDMA allows WiMAX to support long distance, low-bandwidth telecommunications, or short distance, high-bandwidth transmissions. Furthermore, WiMAX can also be adapted for focused point-to-point communication, or geographically diffuse cellular network applications.

Typical cellular communication systems exploit a wireless link between client or mobile devices (e.g., User Equipment (UE) in a 3G network) and Base-Stations (BS) to exchange information. In regard to downlink transmissions (i.e. BS transmitting to client or UE), cellular systems can be classified as either: (i) a one-to-one communication, where a single BS is communicating with a single UE; or (ii) a many-to-one communication, where multiple Base Stations are communicating with a single UE.

Referring to FIG. 1A, in one typical implementation of a prior art WiMAX cellular network 100, multiple S-OFDMA base stations 102 simultaneously transmit identical data streams across the same frequency within respective wireless coverage areas 104. This form of network architecture (not limited to WiMAX networks) is also commonly referred to as a Single Frequency Network (SFN). As shown, $BS_1$ 102A, $BS_2$ 102B, and $BS_3$ 102C—having wireless coverage areas 104A, 104B and 104C, respectively—each provide a unique path to the UE 106. These channel characteristics can be symbolically demonstrated with a Channel Impulse Response (CIR) 108A, 108B, 108C, where an impulse transmitted from each BS in a "vacuum" is represented with its incident response at the UE antenna.

Single Frequency Networks have unique advantages and disadvantages compared to other one-to-one cellular systems. In certain applications, SFNs may provide better coverage than their one-to-one counterparts. Two or more SFN base stations may cooperate such that within their overlapping coverage areas, their signals incident at the receiver constructively interfere. SFN base stations may advantageously use this "beamforming" capability to efficiently utilize spectral resources. Unfortunately, due to the nature of SFN synchronicity, both receiver and base stations implementations have significantly more complexity when compared to their one-to-one counterparts.

FIG. 1B illustrates an aggregate $BS_N$ CIR at the UE 106. As shown, the array of BSs 102A, 102B and 102C may be modeled with a superimposition of the previous CIRs 108A, 108B, and 108C from each individual BS creating a single-source transmission from an aggregate BS 102ABC with a corresponding aggregate channel impulse response 108ABC. The UE does not have any method of identifying which portion of the aggregate impulse was generated by which BS. In standard prior art operation, the UE does not need to identify the originating BS for each received data stream. Instead, the UE uses a standard single-source decoder to extract the data, treating each incoming data stream as separate "diversity" streams. This is also commonly referred to as macrodiversity (where the distance between diversity antennas is much greater than the wavelength of operation).

Location Determination Services

A current topic of interest in wireless (e.g., cellular) networks is the determination of physical location. Physical location has a wide variety of applications for both subscribers, as well as for generalized network operation. The desirability of location management services within cellular networks is evidenced by the deployment of Global Positioning Satellite (GPS, as well as Assisted GPS or AGPS) receiver functionality within cellular phones. The first handsets with integrated GPS were available for broad consumer availability on networks in 2002 in response to, inter alfa, U.S. FCC mandates for handset positioning in emergency calls. Development of location-based services for widespread customer access by network, and third party software developer features were slower in coming, but have gained in popularity as of the date of this filing.

Some common applications utilizing user location information include navigation aids, child safety/location, and fleet management. A typical consumer street navigation aid receives an input location coordinate and calculates optimal directions to a destination location using internally stored street maps. Other uses for personal navigation devices may include hiking, and/or other outdoors based activities in unfamiliar semi-urban/rural areas. In addition, many businesses use location management devices for fleet management. Fleet management devices are used to track the locations of vehicles to improve productivity, resource management, and/or delivery efficiency.

The network operator may also advantageously implement location determination services within subscriber equipment. As previously mentioned, one example of location determination required by the network operator is the Emergency 911 (E911) physical location service. During an E911 call, a cellular phone is required to report its current physical proximity, to assist in deployment of emergency services.

Current E911 implementations within cellular networks may utilize the aforementioned Assisted GPS (A-GPS) system or complete GPS solutions. For low-cost devices, location determination may also be achieved by triangulating signals originating from distinct Base Stations. Since the User Equipment cannot distinguish overlapping signals the various signals must be orthogonal in time or frequency. Dedicating such time or frequency resources for location determination is costly, and inefficient.

As discussed previously, most current solutions for location determination utilize a GPS, or an assisted GPS (AGPS) receiver. Other solutions for global positioning, such as GLONASS (Russian), Galileo (European Union), Beidou (China), etc. also use similar satellite reception technologies. A GPS receiver comprises a high gain antenna, processing chip, and a very precise timekeeping device. Due to the high attenuation of satellite signals and relatively specialized nature of satellite reception, a GPS unit is typically bundled together, and implemented in isolation from the other cell phone components.

Referring to FIG. 2A, an exemplary GPS system 200 comprising a prior art GPS receiver 206 operating within a system or constellation of satellite transmitters 202 is illustrated. The GPS receiver receives a time varying satellite transmission from each satellite. All GPS satellites are synchronized to a single "GPS time reference". The GPS receiver then uniquely identifies each received satellite transmission. The time varying nature of each satellite transmission is used with reference to the GPS receiver's own time reference. By collecting sufficient data from multiple satellites, the GPS receiver can ascertain the absolute "GPS time reference", and corresponding propagation time for each received individual GPS signal. The propagation time for each received GPS signal is used to calculate the distance between each satellite and the GPS receiver. Using the distances from each individual satellite, and the known location of each satellite with respect to the Earth 250 (calculated with the assistance of the ephemeral data embedded within each satellite transmission), the GPS receiver can determine its exact location.

Referring to FIG. 2B a simplified diagram of triangulation of a GPS receiver 206 within a two dimensional plane is shown. The locations of the satellites 202A, 202B, and 202C are known, and expressed in coordinates $C_1$, $C_2$, and $C_3$. The propagation distances $d_1$, $d_2$, and $d_3$ are determined based on the propagation time multiplied by the speed of light (c). As is shown, a distance $d_1$ from a first coordinate $C_1$ uniquely identifies a ring of points $r_1$. An additional distance $d_2$ from a second coordinate $C_2$ uniquely identifies two points within the plane: $p_2$, and $p_3$. By including, yet another distance $d_3$ from a known coordinate $C_3$, a unique single point in the two-dimensional plane is described: $p_3$. Therefore, given a known coordinate system, and sufficient path information, a GPS receiver can calculate its unique position $p_3$.

In a typical GPS receiver, at least five satellites are required to pinpoint the GPS receiver's location (the additional $3^{rd}$ spatial dimension requires a fourth additional satellite; yet another fifth additional satellite is required to remove timing ambiguity). Typically, a number greater than five is necessary to improve timing and channel accuracy. Additional satellite information improves coordinate accuracy and time reference.

In addition to the GPS/AGPS solutions discussed above, several solutions have been contemplated for location determination within SFN systems. For example, United States Patent Publication No. 20050148340 to Guyot published Jul. 7, 2005 and entitled "Method and apparatus for reporting location of a mobile terminal" discloses a method for use by a wireless communication network in responding to a request originating from a requester for an estimate of the position of a mobile terminal. The request is provided via an LCS server along with a requested accuracy. The method includes a step in which a controller of the radio access network by which the mobile terminal is coupled to the cellular network provides a response to the request including not only the position/location estimate but also either the accuracy of the estimate in a form directly useable by the LCS server (e.g. in same form as the requested accuracy), or an accuracy fulfillment indicator, i.e. an indication of whether the accuracy of the estimate is at least as good as the requested accuracy.

United States Patent Publication No. 20050186967 to Ozluturk published Aug. 25, 2005 and entitled "Multi-network location services support" discloses apparatus and methods for location of a portable device with a transmitter, such as a wireless transmit/receive unit (WTRU) in a cellular telecommunications network, which is obtained by a primary network augmented by data obtained from a diverse network. In a particular configuration, changes of the indication of the location, of the portable device are used to update positional information, such as positional information obtained from a GPS receiver.

United States Patent Publication No. 20050266855 to Zeng et al. published Dec. 1, 2005, entitled "Method and system for radio map filtering via adaptive clustering" discloses a method for estimating a location of a wireless device in a wireless local network. The method includes forming a first set comprised of the signal strength received from access points that the wireless device received a signal from and an indicator of no signal strength measured for access points that the wireless device did not receive a signal from. Next, a scan subset can be formed comprised of access points in the first set that has associated signal strength. Next, a cluster comprised of the calibration points can be formed based on the scan subset. A distance between the first set and each of the calibration point in the cluster can be calculated. Then, the smallest distance can be selected as the location estimate.

Chinese Patent Publication No. CN1791266 to Duan, published Jun. 21, 2006 and entitled "Urgent calling method capable of rapid positioning" discloses a fast-location emergence call method comprising: the mobile platform sending the emergency call request information with location detection information to wireless network controller to transfer to mobile exchange center; the latter builds the emergency call between mobile platform and emergency help center according to information and locates the mobile platform. Wherein, the said information is the detection result of SFN-SFN observation time difference of two base station sub area signal after wireless network controller sending detection control information.

United States Patent Publication No. 20060240843 to Spain et al., published Oct. 26, 2006 and entitled "Estimating the location of a wireless terminal based on non-uniform locations" discloses a technique for estimating the location of a wireless terminal at an unknown location in a geographic region. The technique is based on the recognition that there are traits of electromagnetic signals that are dependent on topography, the receiver, the location of the transmitter, and other factors. For example, if a particular radio station is known to be received strongly at a first location and weakly at a second location, and a given wireless terminal at an unknown location is receiving the radio station weakly, it is more likely that the wireless terminal is at the second location than at the first location.

U.S. Pat. No. 6,011,974 to Cedervall, et al. issued Jan. 4, 2000 entitled "Method and system for determining position of a cellular mobile terminal" discloses a method and system by which a round-trip calculation is used to determine the distance between a mobile radio station (MS) and a radio base station (BS) using the apparent uplink and downlink signal propagation air-times (e.g., T-up and T-down). As such, no absolute time reference is required. The MS and BS report to a service node in the mobile network the local departure and arrival times of the uplink and downlink signals, and calculate the apparent air-times, T-up and T-down. The distance, D, between the MS and BS can be calculated as D=c(T-up+T-down)/2, where "c" equals the speed of light. The distances, D1, D2 and D3, to at least three base stations whose locations are known, can be used in a triangulation algorithm to determine the MS's position.

WIPO Publication No. 2007/112696 published Apr. 4, 2007 to Zhang and entitled "Method and system for realizing multimedia broadcast multicast service" discloses a method and a system for realizing multimedia broadcast multicast service. While receiving the multimedia broadcast multicast service in a SFN network, the user equipment obtains the idle transmission interval time slot in a transmission interval between two successive frames or in a transmission interval of a frame via the compression mode or data scheduling by the schedule unit. The user equipment could handover to the LTE network (or other networks) to perform measurement, registration or paging correspondence as required. The user equipment could handoff to the LTE network to perform cell reselection or location area update during the transmission interval time slot based on the measurement results. When receiving a call, the user equipment could handoff to the LTE network to send a rejection-receiving-message or receive corresponding service during the transmission interval time slot.

United States Patent Publication No. 20070202880 to Seo et al. published Aug. 30, 2007 and entitled "Method of estimating location of terminal in switched-beamforming based wireless communication system" discloses a terminal location estimation method in a wireless communication system in which an access point (AP) provides an access service to a plurality of terminals that includes defining a plurality of beam spaces around the AP through space multiplexing; scheduling the beam spaces according to a predetermined pattern; simultaneously forming a beam in at least one beam space; and detecting the existence and location of a terminal according to whether a response message in response to the formed beam is received. Accordingly, an AP forms beams in a predetermined scheduling pattern, and each of the terminals detecting the beams registers its location by informing the AP that each of the terminals exists in a relevant beam area, and thus, a location of each of the terminals can be estimated without using a complex DOA algorithm.

United States Patent Publication No. 20070225912 to Grush published Sep. 27, 2007 and entitled "Private, auditable vehicle positioning system and on-board unit for same" discloses a system and method to generate a private, auditable, evidentiary quality record of the location-history of an asset or person. Grush addresses ten improvements over existing systems that are proposed or used for metering for payment services for tolling roads, parking or pay-as-you-drive insurance, namely, cost-effective location accuracy in harsh signal environments, evidentiary assurance of location estimation, handling of dynamic and stationary positioning in a single device, high-ratio compression for a set of stationary positions in urban canyon, high-ratio compression for a dynamic tracklog in urban canyon, high-ratio compression for a set of asset motion behaviors, a method of remote device health check, including anti-tampering, removal of residual price assignment errors, anonymous use without on-board maps, and a method of deconsolidating payments to multiple payees with multiple payment regimes. This system can be applied to road-pricing, congestion-pricing, metered-by-the-minute parking and pay-as-you-drive insurance, incorporating privacy management, and legal admissibility of the evidentiary record. This same device can also be applied to vehicular fleets, military ordinance, or other location audits for assets whether motorized or not, as might be needed in evidence of contract fulfillment or other forms of non-real time geofencing audits.

United States Patent Publication No. 20080004042 to Dietrich et al. published Jan. 3, 2008 and entitled "Enhanced wireless node location using differential signal strength metric" discloses a wireless node location mechanism that employs a differential signal strength metric to reduce the errors caused by variations in wireless node transmit power, errors in signal strength detection, and/or direction-dependent path loss. As opposed to using the absolute signal strength or power of an RF signal transmitted by a wireless node, implementations of the location mechanism compare the differences between signal strength values detected at various pairs of radio receivers to corresponding differences characterized in a model of the RF environment. One implementation searches for the locations in the model between each pair of radio receivers where their signal strength is different by an observed amount.

Despite the variety of the foregoing approaches, current location determination capabilities for UEs require large amounts of dedicated resources, such as additional integrated circuits, processing overhead, and/or increased power consumption. These requirements come at an appreciable cost, whether in terms of actual monetary cost of manufacturing the UE or providing the user's subscription service, or in terms of reduced performance (e.g., reduced battery life, etc.). Accordingly, there is a salient need for improvements to current solutions for mobile device location determination.

Ideally, such improved methods and apparatus would work in existing wireless or cellular network infrastructure with little to no replacement of current hardware deployments, and minimal to no impact on software configuration. Such methods and apparatus would also be transparent to non-enabled UE.

Furthermore, a desirable solution would provide estimations of UE location to within a certain level of accuracy, so as to facilitate and support services which require such level of accuracy in order to be useful to the subscriber.

In addition, such improved apparatus and methods would obviate the need for expensive and/or dedicated hardware components, such as those commonly used for a satellite co-receiver (e.g. GPS).

These improved apparatus and methods would also advantageously leverage existing network (e.g., single frequency network or SFN) topology to enable a UE to identify its location regardless of where in the network it is actually located; i.e., without "holes" in location determination coverage.

SUMMARY OF THE INVENTION

The present invention satisfies the aforementioned needs by providing improved apparatus and methods for location determination within a wireless network.

In a first aspect of the invention, a method of broadcasting signals within a wireless network is disclosed. In one embodiment, the network comprises a Single Frequency Network (SFN) having a plurality of transmitters, and the method comprises including transmitter-specific information in at least a portion of data frames transmitted from the transmitters.

In one variant, the SFN comprises a WiMAX (IEEE Std. 802.16) compliant network.

In another variant, the transmitter-specific information is adapted so that a receiver of the signals transmitted from the plurality of transmitters can uniquely resolve at least a portion of the signals from individual ones of the transmitters. The method further comprises using the unique resolution of at least a portion of the signals for performing a location determination of the receiver.

In another embodiment, the method of broadcasting signals is within a wireless network to enable location determination, and the method comprises: providing a radio signal adapted to communicate data within the network, at least a portion of the data comprising a data payload; embedding a plurality of identifiable signatures within the data; weighting the data; and transmitting the data to one or more receiving devices. The identifiable signatures and the weighting enable triangulation of the one or more receiving devices.

In one variant, the data payload is identically transmitted from multiple locations within the network, and at least a subset of the identifiable signatures is uniquely transmitted from a single location.

In another variant the weighting of data is performed at least in part by utilizing coefficients from an orthogonal matrix. The orthogonal matrix may comprise a normalized orthogonal matrix or a Walsh-Hadamard matrix.

In another variant the act of weighting comprises multiplying at least a portion of the payload by at least a portion of an orthogonal matrix. The act of weighting may further comprise weighting at least a portion of the identifiable signatures using the orthogonal matrix.

In yet another variant, the act of weighting enables the determination of at least one path characteristic.

In still another variant, the identifiable signatures are used at least in part to identify the originating transmission location of the data.

In still yet another variant, the wireless network comprises a cellular network compliant with a WiMAX Standard, and at least a portion of the receiving devices comprise cellular telephones. The wireless network may comprise a cellular single frequency network (SFN).

In a second aspect of the invention, a computer readable apparatus is disclosed. In one embodiment, the computer readable apparatus comprises a storage medium storing at least one computer program, the program comprising instructions which, when executed by a processing device, enable resolving of two or more signal components (e.g., from different base stations in an SFN network) for, inter alia, use in location determination within the network. The instructions comprise: one or more first instructions adapted to separate one or more data streams into at least two corresponding components comprising a unique component and a common component; one or more second instructions adapted to derive from the unique component one or more parameters related to a physical path; one or more third instructions adapted to generate an indication of a physical location.

In one variant, the computer readable apparatus further comprises one or more fourth instructions adapted to perform operations unrelated to location determination on the common component.

In another variant, the one or more third instructions derive the indication of the physical location, at least in part, from the unique component. Alternatively, the one or more third instructions may derive the indication of physical location, at least in part, from the common component.

In still another variant, the computer readable apparatus comprises a memory resident within a mobile wireless device.

In yet another variant, the one or more first instructions, the one or more second instructions and the one or more third instructions are not continuously executed.

In a third aspect of the invention, a wireless device is disclosed. In one embodiment, the wireless device comprises: a digital processor; a wireless interface in data communication with the wireless interface and configured to receive wireless data; apparatus configured to operate in a legacy mode and a non-legacy mode, wherein: the legacy mode comprises processing data as if received from one source; and the non-legacy mode comprises processing data as if received from multiple identifiable sources.

In one variant, the wireless interface is configured to interface to a cellular Single Frequency Network (SFN). The Single Frequency Network comprises for example a WiMAX-compliant network.

In another variant, the digital processor is operatively linked to the apparatus of the wireless device.

In yet another variant, the wireless device comprises a multi-touch user interface that can accommodate and respond to at least two user touch inputs simultaneously.

In yet a further variant, the legacy mode operation comprises processing learning sequence (LS) data.

In another variant, the non-legacy mode operation comprises processing at least one of: (i) weighted payload data; and (ii) weighted base station identification information.

In a fourth aspect of the invention, a method of obtaining performance enhancement is disclosed. In one embodiment, a method is adapted to obtain diversity-based performance enhancement within a wireless network, and comprises: receiving data for transmission over a wireless interface; weighting at least a portion of the data based on an orthogonal matrix; and transmitting the weighted data to at least one receiving device of the network. The weighting introduces additional diversity into the data.

In one variant, the weighting comprises: utilizing a first weighting for a first plurality of frames of the data; and utilizing a second weighting for a second plurality of frames of the data.

In another variant, at least one of the first and second weightings introduces constructive interference within at least a portion of the transmitted signal received by the at least one receiving device.

In another variant, the method further comprises processing the transmitted weighted data within the at least one receiving device.

In still another variant, the method further comprises distributing at least a portion of the weighted data over multiple data frames in order to obtain a maximum diversity gain.

In yet another variant, the act of distributing is performed at least in part using an interleaver.

In a fifth aspect of the invention, a method of broadcasting signals is disclosed. In one embodiment, a method of broadcasting signals within a wireless network to enable location determination, the method comprises: providing a radio signal adapted to communicate data within the network; embedding a plurality of identifiable signatures within the data; determining a weighting matrix size necessary to avoid ambiguity between at least two base stations within the network; generating a matrix of the determined size; weighting the data according to the matrix; and transmitting the data to one or more receiving devices; wherein the identifiable signatures and the weighting enable at least one of the plurality of receiving devices to identify the base stations without ambiguity.

In a sixth aspect of the invention, a method of providing the location of a mobile device within a wireless network is disclosed. In one embodiment, the method comprises: providing a plurality of data frames; inserting identification fields into at least a portion of the frames; and encoding at least a portion of the frames using a matrix. The identification fields and the encoding enable a receiver to determine the identity of multiple unique base stations transmitting the frames, and the transmission of the frames is performed using a single time slot and a single frequency.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 4A graphically illustrates exemplary Walsh-Hadamard matrices of the type useful with the present invention.

DETAILED DESCRIPTION OF THE INVENTION

Figure 1A:
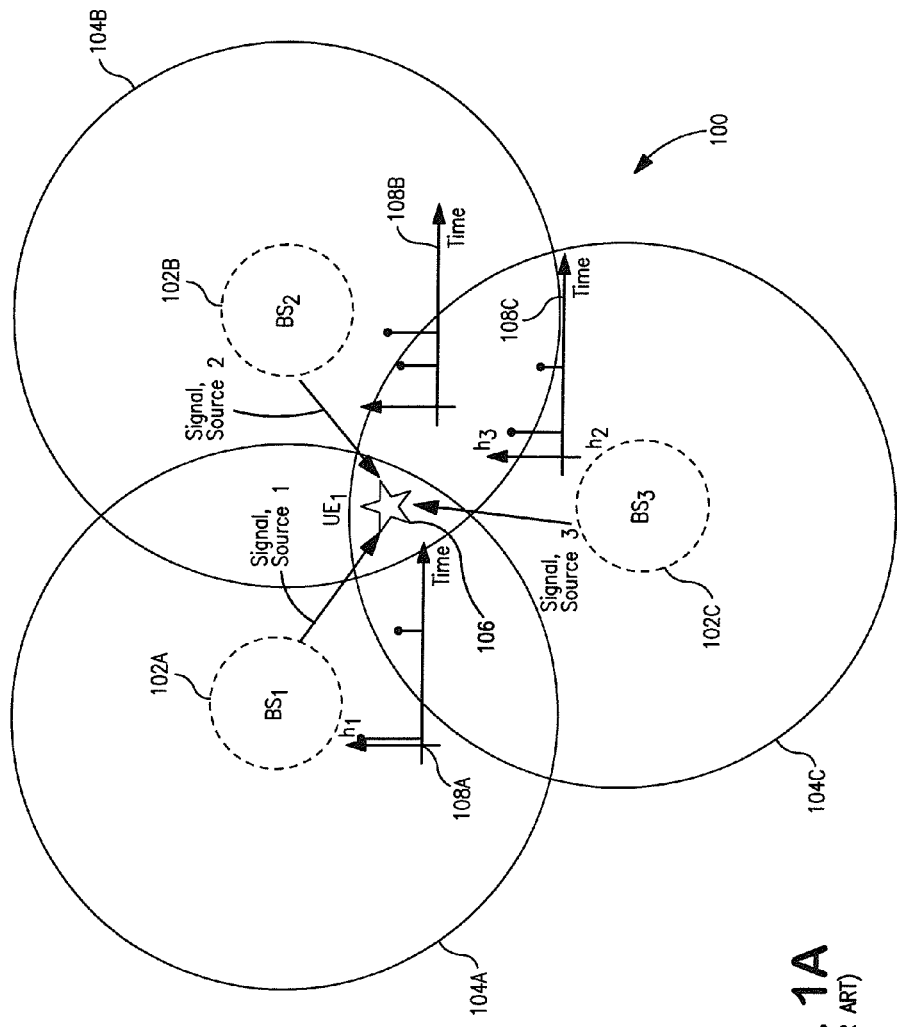
FIG. 1A is a graphical illustration of an exemplary prior art WiMAX cellular network architecture, including multiple S-OFDMA base stations.

Reference is now made to the drawings, wherein like numerals refer to like parts throughout.

As used herein, the terms "client device", "end user device" and "user equipment" or "UE" include, but are not limited to cellular telephones, smartphones (such as for example an iPhone™), personal computers (PCs), such as for example an iMac™, Mac Pro™, Mac Mini or MacBook™, and minicomputers, whether desktop, laptop, or otherwise, as well as mobile devices such as handheld computers, PDAs, video cameras, set-top boxes, personal media devices (PMDs), such as for example an iPod™, or any combinations of the foregoing.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, and ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "network" and "bearer network" refer generally to any type of data, telecommunications or other network including, without limitation, data networks (including MANs, PANs, WANs, LANs, WLANs, micronets, piconets, internets, and intranets), hybrid fiber coax (HFC) networks, satellite networks, cellular networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, 802.11, ATM, X.25, Frame Relay, 3GPP, 3GPP2, WiMAX, WAP, SIP, UDP, FTP, RTP/RTCP, H.323, etc.).

As used herein, the terms "network interface" or "interface" typically refer to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), IrDA or other wireless families.

As used herein, the terms "WiMAX" and "IEEE 802.16 Standard" refer without limitation to, as applicable, IEEE-Std. 802.16-2004 (often referred to as 802.16d) entitled "IEEE Standard for Local and metropolitan area networks—Part 16: Air Interface for Fixed Broadband Wireless Access Systems" dated Oct. 1, 2004, IEEE Standard 802.16e entitled "IEEE Standard for Local and metropolitan area networks—Part 16: Air Interface for Fixed and Mobile Broadband Wireless Access Systems—Amendment 2: Physical and Medium Access Control Layers for Combined Fixed and Mobile Operation in Licensed Bands and Corrigendum 1", and IEEE-Std. 802.16m, and any revisions thereof, which are individually and collectively incorporated herein by reference in their entirety.

As used herein, the term "wireless" means any wireless signal, data, communication, or other interface including without limitation Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiFi (IEEE-Std 802.11x, including 802.11n and 802.11VHT), WiMAX (802.16), MWBA/802.20, narrowband/FDMA, OFDM, PCS/DCS, analog cellular, CDPD, satellite systems, millimeter wave or microwave systems, acoustic, and infrared (i.e., IrDA), IMT-Advanced, IMT 2000, and 3GPP LTE (long term evolution)/LTE-advanced.

OVERVIEW

In one fundamental aspect, the present invention provides, inter alia, methods and apparatus that enable a receiver (e.g., UE) to distinguish between the received channel characteristics of each of the multiple base stations within its supporting Single Frequency Network (SFN). While SFN operation transmits an identical data stream from each base station to the UE, in one aspect of the present invention, the identical data stream is: (i) concatenated or modified with a unique base station identifier; and (ii) encoded in a manner which can be separated by the UE. The UE, using the concatenated and encoded data stream, can calculate path characteristics (such as path latency, and Direction of Arrival (DoA)) to triangulate its position within the SFN.

In one embodiment, the weighting of frames from base stations is utilized. The method of frame weighting is governed in one variant by scalar and/or complex factors taken from an orthonormal matrix M. The properties of the matrix M enable the UE to uniquely identify the base station of origin. In addition, by embedding a base station signature within each frame, the UE can determine the path characteristics for each correspondingly unique base station.

Advantageously, UE "transparency" is maintained via the foregoing approach; i.e., assuming that the UE uses only data (learning symbols) of a single data frame to perform channel estimation, no modification to the receiver architecture is required. The signals "observed" by the receiver correspond to an addition of all impulse responses just as with the prior art SFN approach, with the exception of the weighting by the matrix M in the present invention. Stated differently, the weighting (and unique embedded IDs) require no specialized or different decoder architecture. Moreover, for those receivers not using the location estimation capabilities provided by the matrix and IDs, no knowledge of the matrix M is required, thereby making the transmitted signals of the present invention completely "transparent" to legacy devices.

In another aspect of the invention, methods for providing unique base station identification to a receiving device are disclosed. Specifically, methods are utilized to "overload" base stations onto orthonormal codes, such as in cases where the codes are not otherwise sufficient to uniquely resolve each base station's identity. The overloading of codes enables a finite number of codes to be reused among any number of base stations through careful planning of code assignments with respect to geography, and UE deployments. This approach advantageously maintains the smallest possible code matrix. Alternatively, more codes (i.e., a larger matrix) can be produced to handle the overload and allow for completely unique code assignment.

More generally, the UE may perform source separation of the SFN signals and send the separated Channel Impulse Responses (CIR) to the network. In two such exemplary embodiments, the application level processing functionality (e.g. UE position determination) is performed within the SFN itself (versus the receiver), facilitated either by: (i) the UE passing "raw" extracted path data to an entity within the network, or (ii) partially processed path data within uplink transmissions from the UE to multiple base stations. The network returns application specific results (e.g. location, and or coordinates) of the UE to the UE if desired, and/or to third parties or other entities (e.g., a location update website accessible by a user), such as for fleet vehicle location, child location by parents, etc.).

DETAILED DESCRIPTION OF EXEMPLARY EMBODIMENTS

Exemplary embodiments of the present invention are now described in detail. While these embodiments are primarily discussed in the context of a Single Frequency Network (SFN) network, and more specifically to fourth generation (4G) WiMAX networks, it will be recognized by those of ordinary skill that the present invention is not so limited. In fact, the various aspects of the invention are useful in any wireless network that can benefit from, among other things, (i) the ability to resolve individual signals from one another; and/or (ii) enabling location or triangulation techniques within its clients, using many-to-one downlink communication links, as is disclosed herein. For example, various aspects of the invention can be applied to other advanced telecommunication technologies include IMT-Advanced (International Mobile Telecommunications—Advanced), which is a technology from the ITU for mobile communication systems with capabilities which go further than that of IMT-2000. IMT-Advanced was previously known as "systems beyond IMT-2000".

Similarly, various aspects of the invention can utilized within the 3GPP LTE/LTE advanced framework. LTE-Advanced comprises inter alia a software upgrade for LTE networks and enables peak download rates over 1 Gbit/s. It also targets higher spectral efficiency, faster switching between power states and improved performance at the cell edge.

Moreover, it will be appreciated that the techniques described herein are not necessarily limited to "SFNs" per se, but rather may be applied to any network where multiple wireless signals converge at least partly within a single frequency or frequency band, and would be otherwise inseparable or indistinguishable.

Figure 1B:
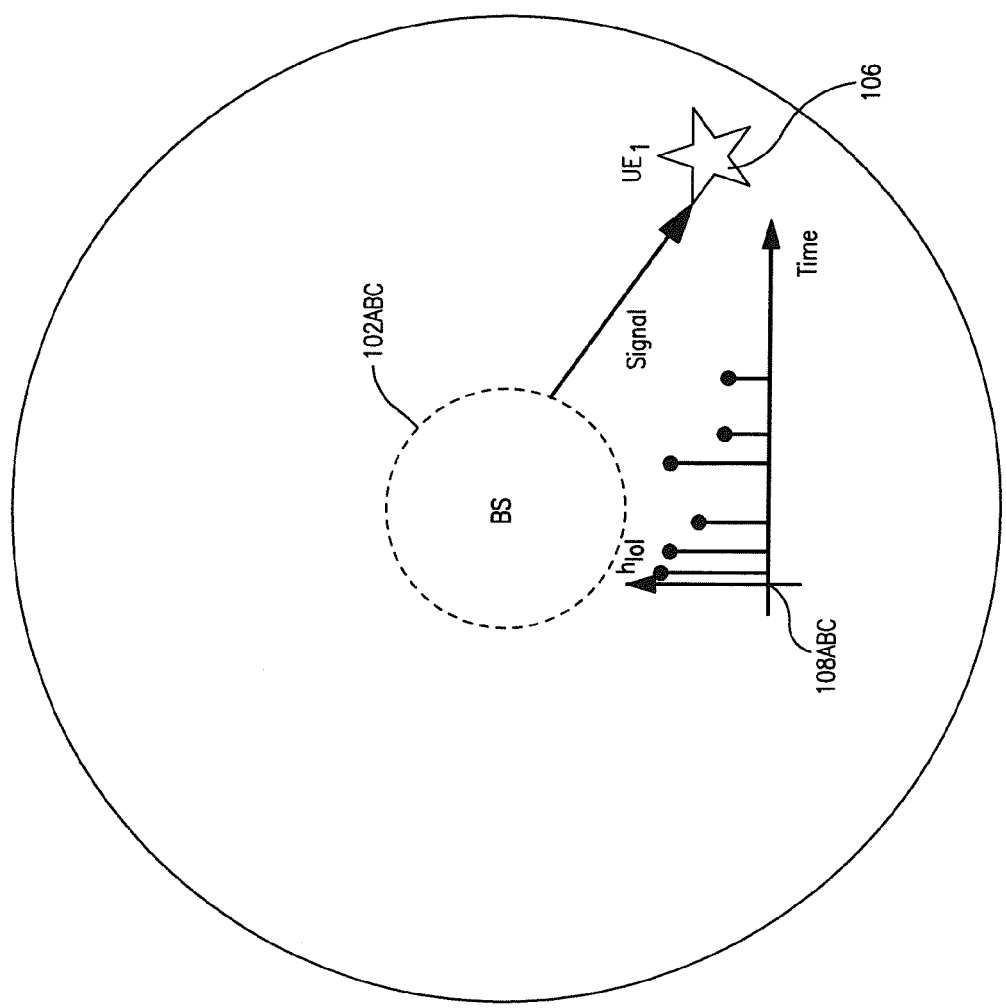
FIG. 1B is a graphical illustration of an aggregate prior art base station channel impulse response (CIR) at the UE of the network illustrated in FIG. 1A.
Figure 2A:
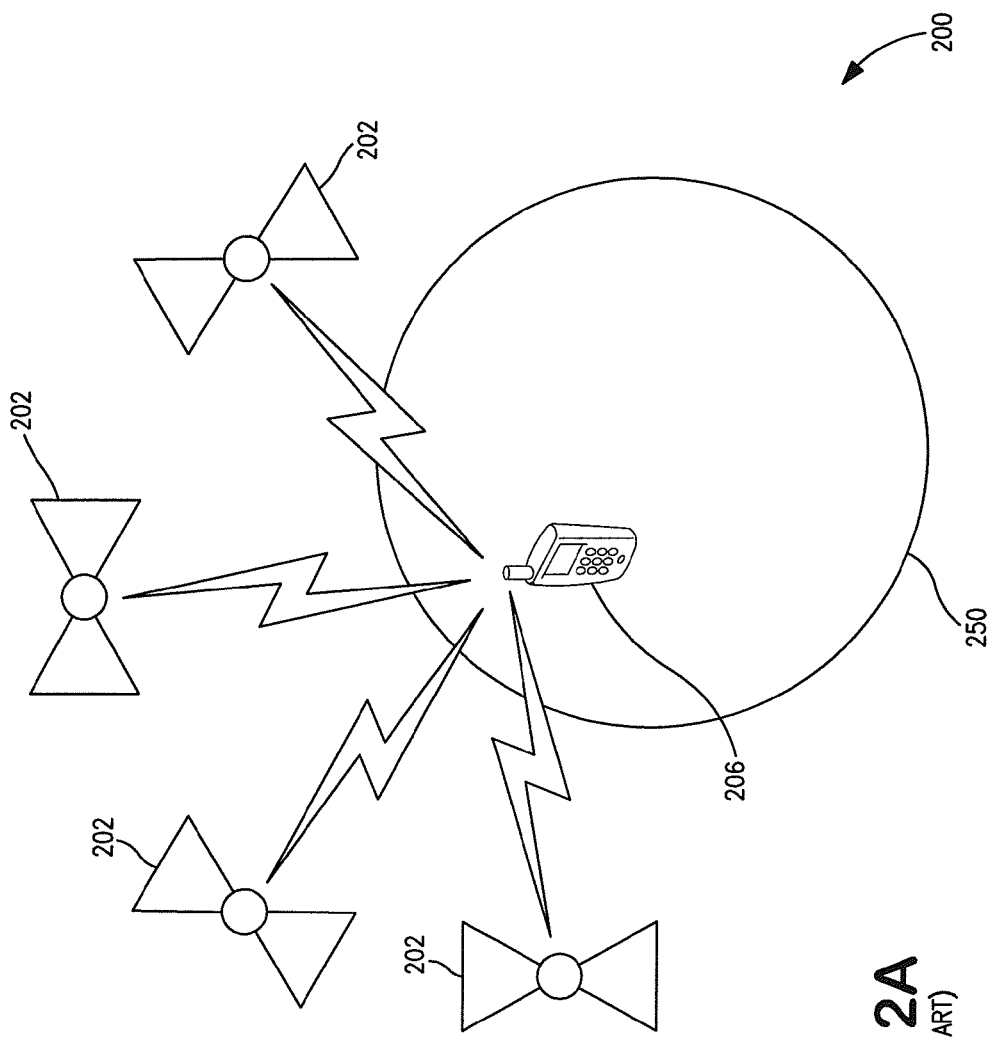
FIG. 2A illustrates exemplary prior art global positioning system (GPS) architecture.
Figure 2B:
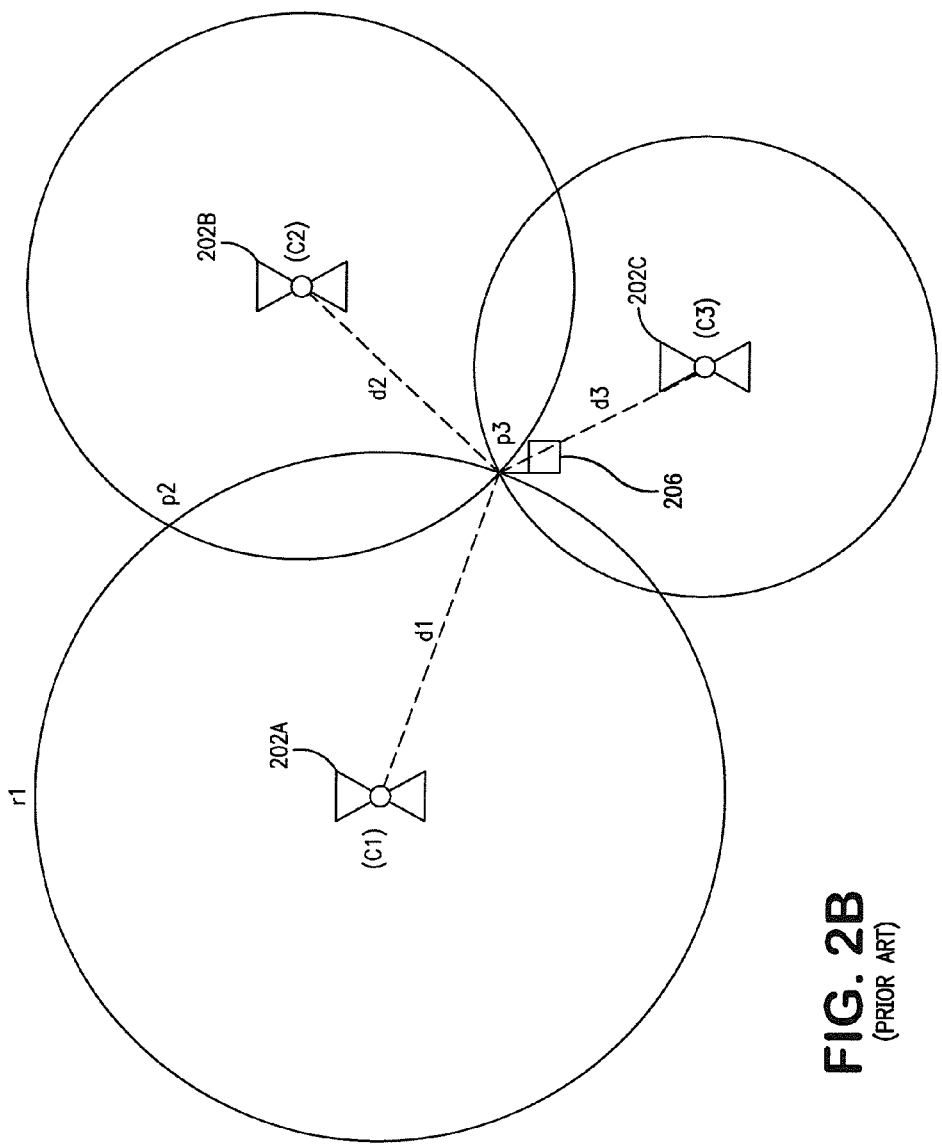
FIG. 2B is a simplified diagram showing prior art triangulation of a GPS receiver within a two dimensional plane.

Referring back to FIG. 1A demonstrating the prior art CIR 108 of a SFN 100, multiple BS 102 are transmitting to the UE 106. In order to perform location estimation in the UE, based on triangulation techniques, the UE must be able to estimate the reception characteristics (i.e., Direction of Arrival (DoA), multipath characteristics, reception power, etc.) per each transmitting BS. In a typical SFN, the UE intentionally does not identify specific BSs, as it is unnecessary for transmit macrodiversity operation, and extremely inefficient in both hardware and software implementations. A typical SFN is consequently designed such that the UE "sees" only one single equivalent transmitting source as illustrated (and previously explained) in FIG. 1B. Without additional information, the identification of each single BS is quasi-impossible (or extremely costly in terms of calculation power, power consumption, etc.).

The exemplary embodiment of the invention disclosed herein modifies and improves upon the state-of-the-art SFN approach, such that existing advantages of SFN approaches are maintained, while also affording the UE the ability to determine inter alias (i) the BS IDs of all distinct BSs, and (ii) the distinct channel impulse responses (CIRs) from each BS to the UE. Once the UE has determined the distinct CIR, the UE can estimate relative distances from each BS, and subsequently can triangulate to generate an estimate of its location.

Methods—

UE-Based Location Determination—

In one aspect of the invention, the method of operation can be logically divided between the operation of the base station (s) 102, and the operation of the user equipment (UE) 106. Each base station is responsible for individually modifying its waveform such that the receiving user equipment may extract location determination parameters. However, in one exemplary embodiment now described, the base station is not directly involved with the calculation of location determination (i.e., the base station does not determine the location of the user equipment). Rather, the user equipment (or a proxy or other device in communication therewith) is responsible for extraction of location determination parameters, and location determination.

Figure 3A:
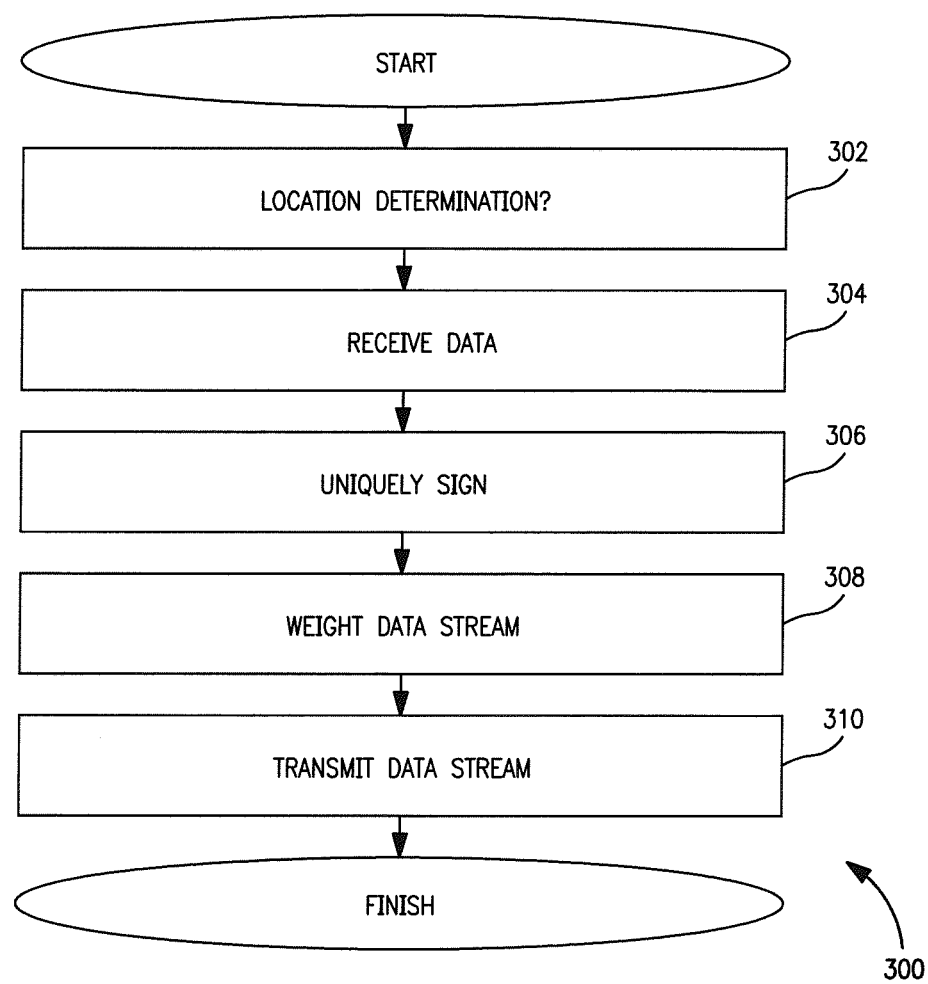
FIG. 3A is a logical flow diagram illustrating process flow for a first exemplary method of base station operation in accordance with the principles of the present invention.

Referring now to FIG. 3A, an exemplary method of base station operation is described. At step 302, the base station determines if location determination is supported for the user equipment. For example, each base station may be set into a default mode; such a mode may enable location determination all of the time, part of the time (e.g., only when certain prescribed criteria are met, such as when the UE is location-determination enabled, during certain windows of time, when certain signals are received, etc.), or at no time.

The embedding of parameters within the transmitted data stream from the BS may be performed according to any number of different schemes, including for example: (i) on a user-by-user selectable basis, (ii) one or more UEs only when certain criteria are met (e.g., UE is location-enabled and registered within the network, and the BS has sufficient processing bandwidth to accommodate, etc.); (iii) periodically; or (iv) at all times for all registered UEs. Myriad other combinations and permutations of conditions under which location-related parameters are embedded within the BS transmissions will be appreciated by those of ordinary skill given the present disclosure.

Additionally, the location determination mode may be dynamically initiated (such as upon request), which in some commercial implementations would require the existence of messaging capabilities between the UE and BS (e.g., the UE sending a "location request" or similar message to the relevant BSs, and the latter responding by embedding the necessary parameters within their transmissions, and optionally sending an "ACK" or grant message). Extant message capability may also be modified for this purpose, such as where an existing upstream message (i.e., from UE to BS) is modified to carry an extra field, flag or bit to indicate that location data is being requested.

As described elsewhere herein, there may be a fixed or limited number of parameters (such as a base station ID) embedded by the BS in its transmission(s); therefore, it is advantageous in certain situations to only enable specific base stations within the network to participate in location determination operation, thereby avoiding re-use of IDs or possible identification ambiguity.

At step 304 of the method of FIG. 3A, the base station receives the data payload for transmission via the network. Within a cellular network, this data payload typically comprises voice and/or data for transmission across a wireless link (air interface) between the BS and the destination UE.

At step 306, the base station couples a unique identifier (e.g., BS ID) to the transmitted data stream. In one embodiment, the base station embeds a unique identifier within the transmitted data stream such that the receiver can correlate each unique base station to each unique transmission. In some other embodiments, it may be desirable to implement time-specific unique identifiers. A time-specific or time-variant unique identifier may be useful for any number of purposes, such as for further protection against multipath effects (e.g., by specifying windows of time only during which an identifier is valid or "good", thereby eliminating late-arriving multipath transmissions from consideration), security or prevention of surreptitious use of the network (e.g., fraud), etc.

In one example of a "time varying" use case, the serving set of base-stations is changing (there may be various SFNs at distinct frequencies, where the various BSs are constantly changing their "participation" in multiple SFNs). In such a case, the UE could determine the valid BSs, based at least in part, on the time varying identifier.

In another example of "time varying" use, BSs constantly changing their ID following a predefined (secret) pattern. If the UE knows the pattern, it can identify "hacker BSs" which illegally service the SFN. Another fraud prevention mechanism could comprise choosing the BS IDs in such a way that a combination (by a predefined function) of all BS within a FSN would to result in a predefined value. In this manner, only the BS know the (secret) ID sequences and the UE could identify the presence of a "hacker BS" without knowing the secret ID sequences. The UE need only know the combination function and the resulting value.

At step 308, the base station weights its data payload. As described further subsequently herein, each participating base station weights its corresponding transmission appropriately such that each data payload may be individually separated at the receiver.

At step 310, the base station transmits its modified transmission. The base station may require additional timing or frequency modifications, or transmitter conditioning, to comply with other existing neighbor base stations and/or user equipment prior to transmission. Additionally, other processing such as channel coding (e.g. Viterbi, Turbo, Reed-Solomon, etc.) may be performed on the data stream prior to transmission.

Figure 3B:
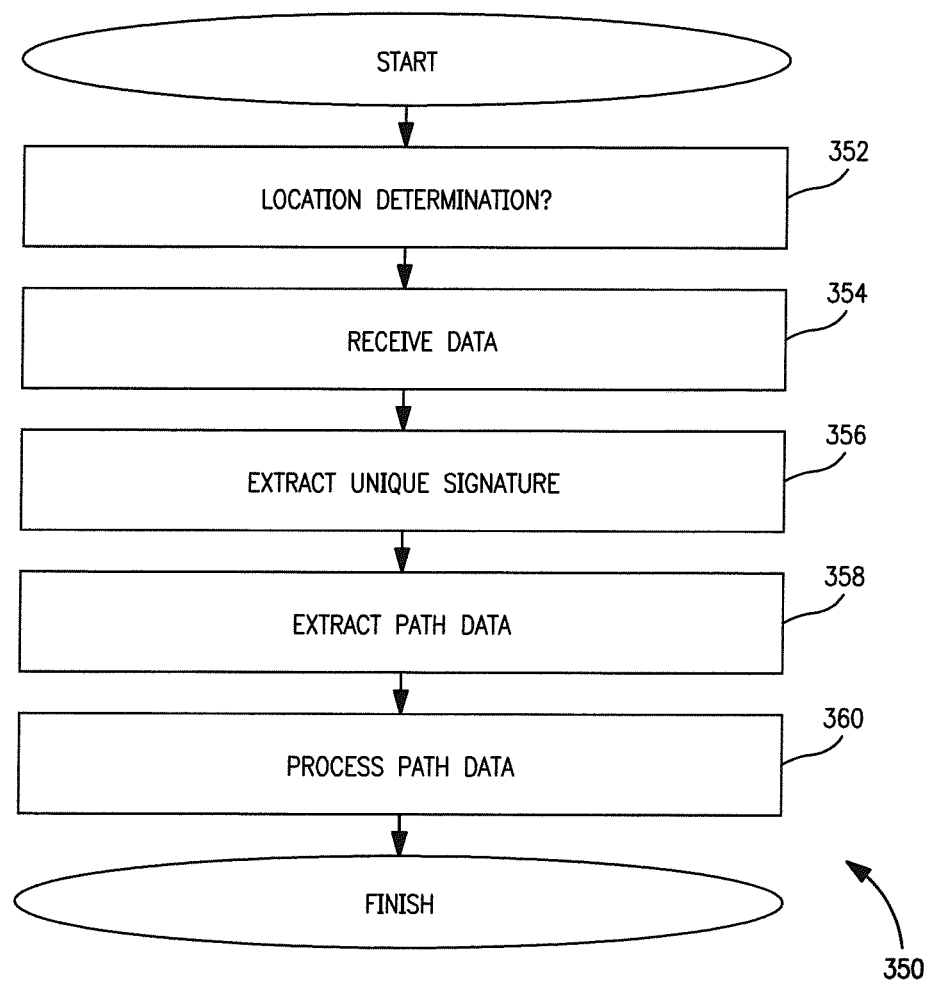
FIG. 3B is a logical flow diagram illustrating process flow for a first exemplary method of user equipment (UE) operation in accordance with the principles of the present invention.

Referring now to FIG. 3B, an exemplary embodiment of the method of user equipment operation is described. At step 352, the user equipment may "implicitly" receive location determination information from the network (i.e., receive the constantly streamed location determination enabling information without a request therefor), or the UE alternatively may explicitly request location determination information such as via the request/grant message protocol previously described.

In one variant, the user equipment is set into a user- or network-definable default mode. Such a mode would for example enable location determination according to the prescribed definition or rule; e.g., all of the time, part of the time (when certain criteria were met for example), or at no time. For instance, the network operator may opt to activate localization features for a subscriber group (e.g. localization is an optional service, etc.). Furthermore, the user equipment may determine that location determination capability is necessary on an application-by-application basis; e.g., when a user invokes navigation or other such software application on the UE which requires location or position data as an input.

At step 354, the user equipment receives the modified transmission from the base station(s). The user equipment may, in some embodiments, require additional timing, frequency modifications or receiver conditioning of the received transmission(s). Furthermore, channel decoding techniques may be implemented in order to correct transmission-induced corruption or other errors.

At step 356, the user equipment (UE) extracts the unique identifiers, and identifies each subsequent base station data stream. Based on the weighting of each signal stream, and the embedded identifier, the user equipment correlates each signal stream path to its corresponding originating base station. The un-weighted data payload is passed to other user equipment logical processes for standard wireless network processing.

At step 358, the user equipment extracts transmission path characteristics. After the user equipment has identified each individual path per step 356 above, the user equipment can extract corresponding path characteristics. Using the derived path characteristics, the user equipment can calculate its relative distance from each received base station.

At step 360, the user equipment determines its relative location with respect to the base stations using position location (e.g., triangulation) techniques. Once the user equipment has determined its relative location, it may use base station or other coordinates to establish an absolute position or geographic location (e.g., LAT/LON or other coordinate system).

Network-based Location Determination Embodiments—

The foregoing embodiments of FIGS. 3A and 3B in effect require the UE to perform the path data extraction and location estimation operations; the base stations merely encode or modify their transmissions as previously described (FIG. 3A) in order to provide the UE with the necessary information, and the UE uses this information (FIG. 3B) to estimate its location.

However, an alternate method of operation is envisaged; i.e., which offloads at least portions of the complexity of location determination from the user equipment 106 to a location determination entity or proxy. This approach has the advantage of inter alga, reducing the complexity of the UE and allowing it to be "thinner" and/or consume less electrical power.

In one such alternate embodiment, each base station (BS) records a corresponding time of arrival (TOA) or time shift of the uplink signal from the user equipment (UE), based on an established network time base or reference (which is already intrinsic to the network in order to permit proper synchronization as previously described). Each base station communicates its time information to the location determination entity (which may comprise for example a dedicated server which is networked with the BS or the MSC). The location determination entity uses the time information and the corresponding base station locations (which are known and may be stored within the server), to identify the unique position of the UE, advantageously without requiring any significant UE interaction. In one variant, the location determination engine, e.g., software process running on a network device or a BS, is tasked with performing the source separation task (i.e., resolving the signals into their components from each BS) in order to determine its position with respect to the base stations. The BS provide the individual propagation delays from the UE(s), thereby making it possible to estimate the UE position(s).

The calculated location is then optionally transmitted to the requesting UEs (or all UEs) over higher layer software signaling, to enable location determination services. In this alternate embodiment, the user equipment is not directly involved with the calculation of location determination (i.e. the base station and or location determination entity determines the location of the user equipment).

Figure 3C:
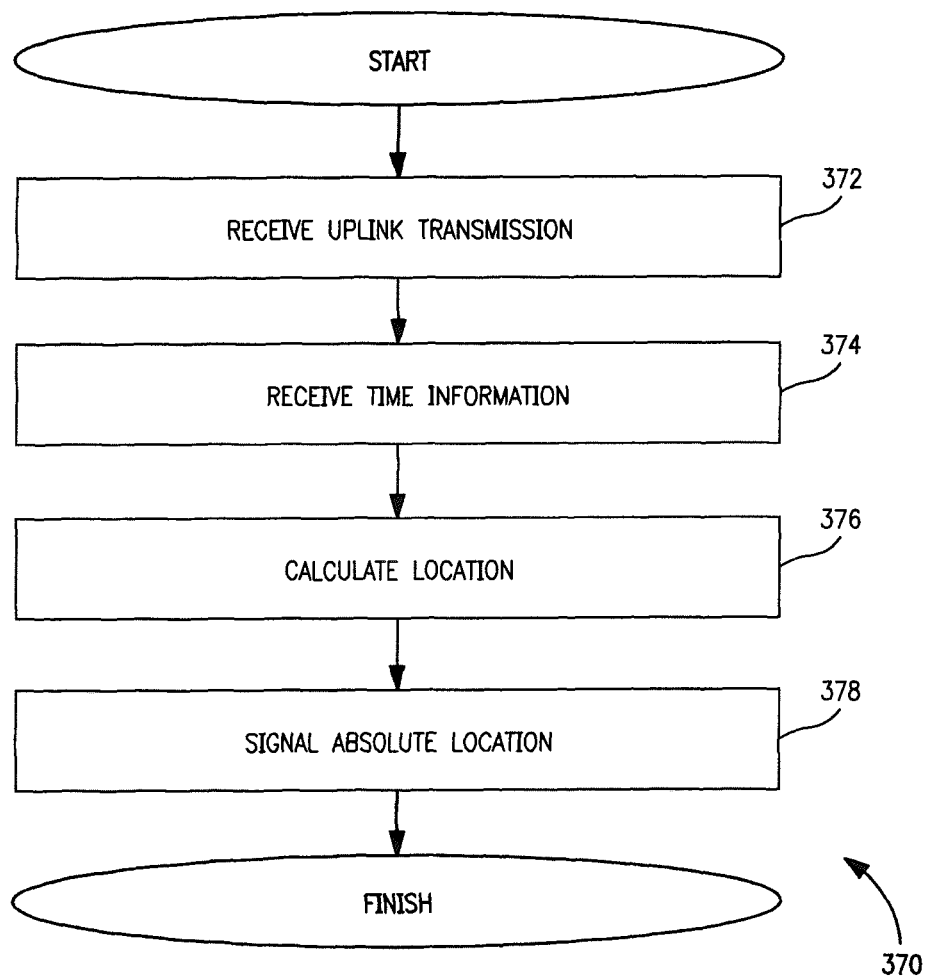
FIG. 3C is a logical flow diagram illustrating process flow for a first exemplary method of network-based estimation of UE location in accordance with the principles of the present invention.

Referring now to FIG. 3C, an exemplary method 370 of base station operation is described according to this alternate (network-based) configuration. As referenced above, it is presumed that the community of base stations is synchronized with respect to itself (i.e., each base station is operating synchronous to other base stations).

At step 372, each base station conversant with the UE 106 of interest receives UE uplink transmissions such as voice, data, or periodic uplink channel accesses. Literally any uplink communication can be utilized for the purposes described herein.

Within a SFN, multiple base stations of the network receive the uplink transmissions from the UE, but at varying time shifts due to differences in path length. Channel decoding techniques may be implemented in order to correct transmission induced corruption. Each base station accordingly calculates its corresponding time or receipt or shift based on receipt of the UE's transmission; e.g., by reference to a system clock or other such time index, for the actual TOA. Alternatively, the base stations may collectively agree to time stamp a particular UE transmission.

At step 374, a location determination entity in data communication with the base stations receives the time information (e.g. time shifts/time stamps) from each base station with which the UE is conversant, and also accesses the location of these base stations. In some embodiments, the location information regarding each base station may be pre-stored, and referenced with a base station identifier. Alternatively, the base station may transmit its location information contemporaneously to the determination entity (such as where moveable or mobile base stations are employed). In one variant, the location determination entity resolves the individual base station signal components, and uses this information as previously described to determine its relative position (and then ultimately that of the UE). At step 376, the location determination entity calculates the location of the UE, using well-known triangulation or other techniques. Specifically, in one variant, and using time information provided by the various base stations (and knowing that the UE transmitted the same uplink signal received by all the participating base stations at the same time), the determination entity can calculate a characteristic path distance for each BS/UE combination, which then allows triangulation to obtain a relative position for the UE (i.e., relative to the base stations). The location determination entity then uses the fixed base station coordinates to establish an absolute position of the UE from the derived relative position. Alternatively, the relative position of the determination entity and the base stations is used to determine UE location.

Multi-path effects (i.e., receipt of secondary, tertiary, etc. signals from the UE at a base station due to multiple propagation paths) can be limited through use of various techniques known in the art including without limitation spatial diversity or knowledge of DoA (e.g., which element of a multi-element azimuth-diverse antenna array that a given signal was received on), received signal strength (RSSI), and/or timing windows to filter late-arriving multipath components.

At step 378, the location determination entity signals the absolute location of the UE to either the network (e.g., Core Network) or directly to the UE, to enable location-based services. Any number of different return paths to provide the location information to the UE can be used, including the WiMAX or cellular downlink, alternate transports or air interfaces such as WiFi (IEEE-Standard 802.11) or satellite links, or even wireline interfaces such as Ethernet, DOCSIS cable modem, etc. This information can also be made available to other devices or parties, such as for example via an Internet website or other user interface; e.g., for parents to locate their child's whereabouts remotely, for fleet managers to locate their vehicles, etc. It can also be used for generating network-based statistics for cell/base station use, network planning, and the like.

Alternatively, instead of a separate location determination entity, one of the base stations can be designated a "master" and the other participating base stations "slaves" such that the slaves transmit the pertinent data to the master for calculation. The calculated UE position is then directly downlinked back to the UE from the master station. Moreover, in a "hybrid" approach, the UE can perform a portion of the location estimation process; i.e., identification and extraction of the path data from the downlink transmissions of the various base stations, and can then send this data back upstream to be processed at the (a) base station. This approach may be useful inter alit where: (i) there is a need or desire to conserve computational power or resources within the UE, (ii) the UE is partly inoperative (e.g., in a "sleep" state, and performing the necessary calculations at the UE would require it to wake up; or (iii) the UE is not the requesting or end user of the location estimation (as may also be the case in the previously discussed network-based embodiment). In one embodiment, calculations are performed in the UE to perform source resolution/separation for the CIRs of all relevant BSs. This comprises in one variant de-weighting of the Walsh-Hadamard coefficients (and some mathematical additions in order to separate the individual component signals), and forwarding this result to the BSs or to the location determination entity or entities.

Example Operation of UE-Based Location Determination—

In the context of the typical system of FIG. 1, the following example further illustrates in detail the separation of location determination information from an exemplary single frequency network according to the methods of FIGS. 3A and 3B (i.e., UE-based determination).

As illustrated in FIG. 1, a UE 106 is operating within a SFN 100 with three local base stations ($BS_1$ 102A, $BS_2$ 102B, and $BS_3$ 102C).

Exemplary Base Station Transmissions—

As indicated above, weighting or other modification of SFN transmissions by various base stations is necessary such that the UEs can, inter alia, perform localization (location estimation) by triangulation. For this purpose, a matrix of weighting coefficients is introduced to distinctly identify each BS. The exemplary matrices of the illustrated embodiment are selected to be orthonormal. Such orthonormality ensures that each column (or basis) of the matrix is both orthogonal (unique; i.e. not a linear superposition of the other basis), and normal (the sum of the squares of the absolute values of one row is equal to "N"). More specifically, the matrix of the type shown in Eqn. (1) below:

$$M = \begin{bmatrix} m_{11} & m_{12} & \ldots & m_{1N} \\ m_{21} & \ddots & \ddots & m_{2N} \\ \vdots & \ddots & \ddots & \vdots \\ m_{N1} & \ldots & \ldots & m_{NN} \end{bmatrix} \quad \text{Eqn. (1)}$$

must satisfy:

$$M \cdot M^H = N \cdot I \quad \text{Eqn. (2)}$$

where I is the identity matrix.

Furthermore, $0^H = (0^*)^T$ must be its hermitian transpose. Also, "N" typically corresponds to the number of distinct base stations considered It will be appreciated that depending on the definition of "orthonormality" that is applied, the form $M \cdot M^H = I$ may be used as well. This approach requires that the coefficients "m_kl" (see Eqn. (1)) are weighted by "1/sqrt(N)"; i.e. the output signal strength of each BS is reduced with "N" rising.

In the present context, however, the BS output power may be desired to be set at the maximum level independent on the number of BS participating in the FSN. In one such case, the factors m_kl are typically chosen such that |m_kl|=1, which ensures that the BS output power is not affected. Consequently, we have $M \cdot M^H = N \cdot I$, since "N" BS will increase the total power of the FSN by a factor "N".

Practical examples for a matrix of the type previously described include without limitation:

1) The Walsh-Hadamard Matrix, constructed iteratively and existing only for the sizes $N=2^X$ with $X=1, 2, 3, \ldots$ per Eqn. (3)

$$M_2 = \begin{bmatrix} 1 & 1 \\ 1 & -1 \end{bmatrix} \text{ and } M_{2n} = \begin{bmatrix} M_n & M_n \\ M_n & -M_n \end{bmatrix} \quad \text{Eqn. (3)}$$

2) The Fourier Matrix existing for any integer "N", the coefficients of the N×N matrix M are $$m_{xy} = e^{j\frac{2\pi}{N}(x-1)(y-1)} \text{ or } m_{xy} = e^{-j\frac{2\pi}{N}(x-1)(y-1)}.$$

It is noted that one advantage of the Fourier matrix is that it exists in any dimension (and not only for $N=2^X$ as for Walsh-Hadamard). It has principally the same properties as Walsh-Hadamard; e.g., with all elements being of unit module, yet also has complex elements ($e^{(j \cdots)}$), which may require more complex operations compared to the +1/−1 elements of the Walsh-Hadamard matrices.

Other types of matrices meeting these requirements will also be recognized by those of ordinary skill in the mathematical arts, and may be used consistent with the present invention for the purpose of inter alfa uniquely identifying each base station.

Referring to FIG. 4A, exemplary Walsh-Hadamard matrixes are diagrammed. The matrix $M_4$ 406 is constructed by expansion of $M_{2\ 4}$ 402 according to $M_{2n}$ 404. Each of the columns of exemplary matrix $M_4$ 406, is orthogonal to the other columns; specifically, column one [1 1 1 1] is not a scalar multiple of any combination of columns two [1 −1 1 −1], three [1 1 −1 −1], or four [1 −1 −1 1]. In addition, each base station of the exemplary embodiment further embeds a unique signature within each data frame, although different schemes and periodicities (e.g., every $n^{th}$ frame, etc.) may be used.

Figure 4B:
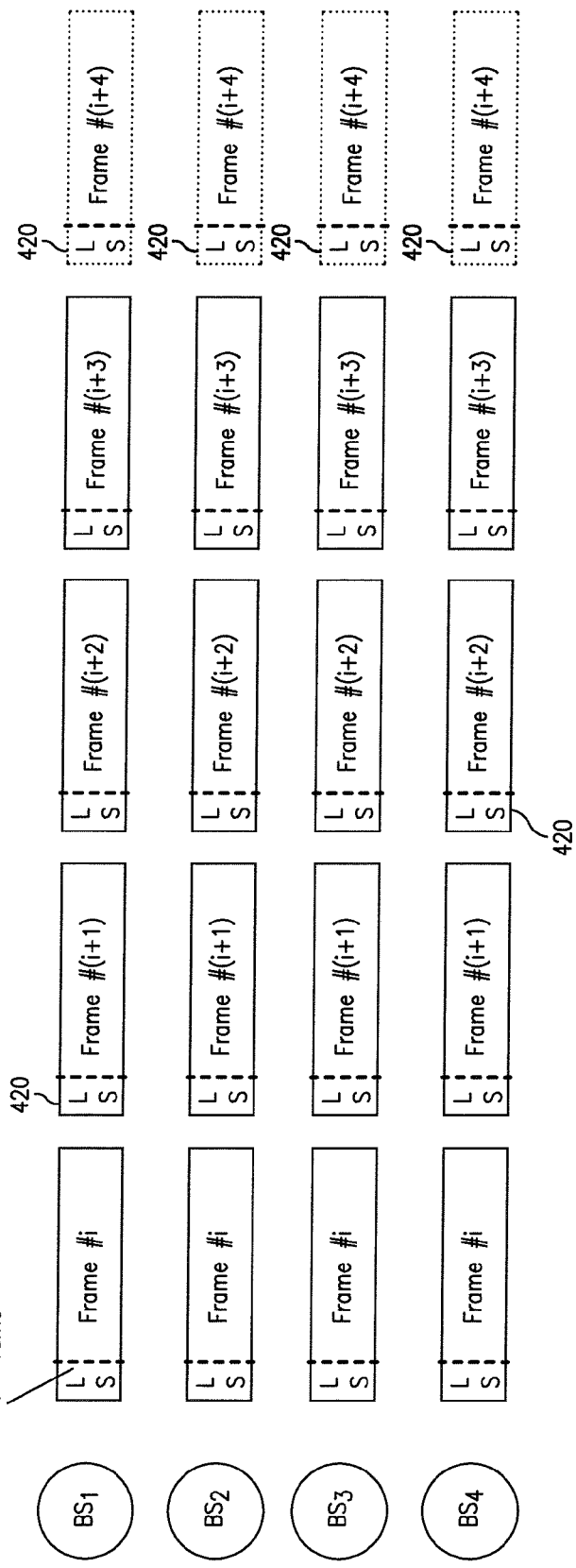
FIG. 4B is a graphical illustration of a prior art SFN transmission frame structure.

FIG. 4B illustrates a typical prior art SFN transmission frame structure from four (4) base stations ($BS_1$-$BS_4$). A series of data frames are transmitted from each BS, each having a learning sequence (LS) 420 which is used for inter alia channel estimation.

Figure 4C:
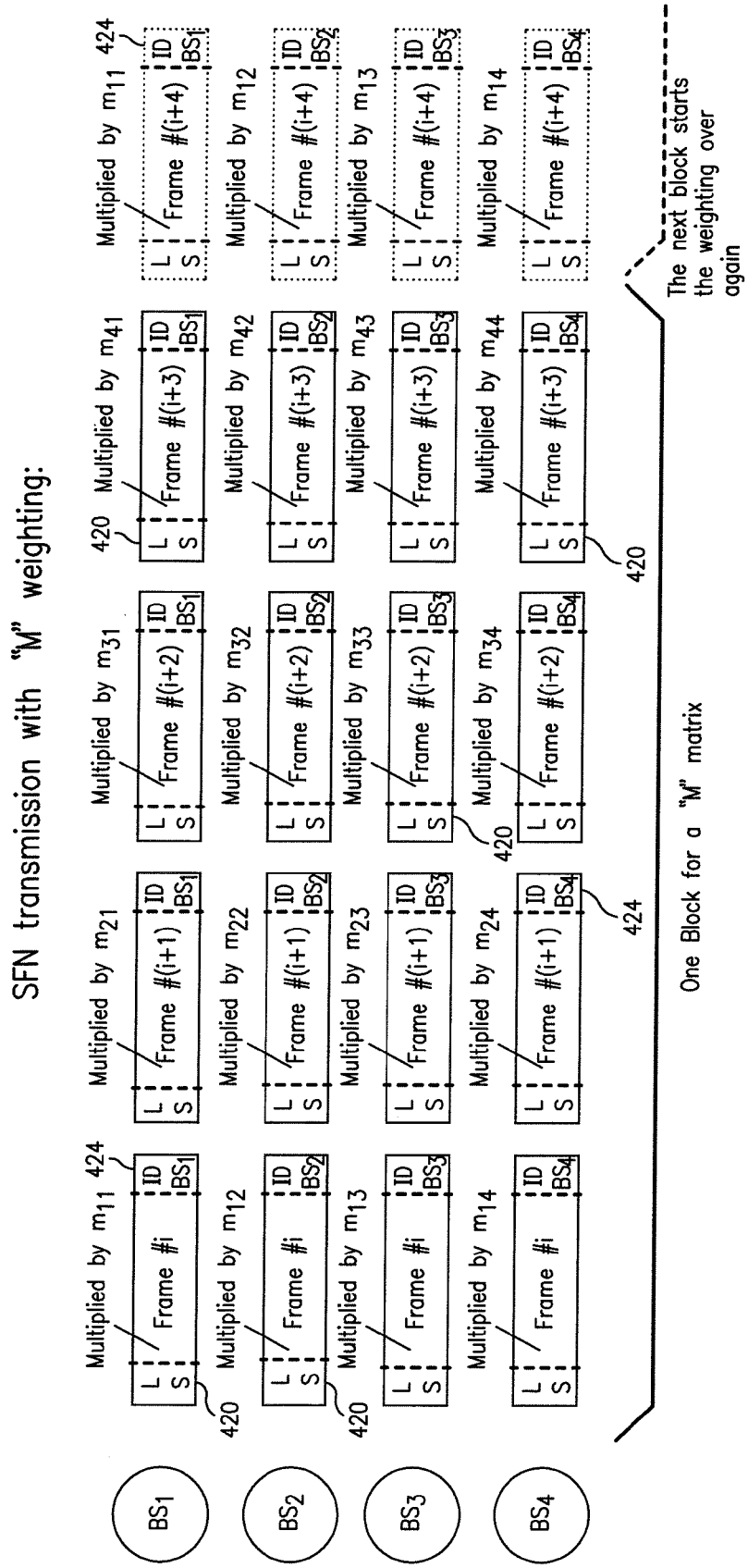
FIG. 4C is a graphical illustration showing insertion of a short field containing the ID of each base station into the frame structure of FIG. 4B in accordance with the principles of the present invention.

As shown in FIG. 4C, the exemplary embodiment of the present invention modifies the sequences of FIG. 4B by inserting a short field 424 in each frame containing the identification (ID) of each BS. The placement of the LS and ID fields within each frame may also take on literally any configuration, with that placement shown in FIG. 4C being merely illustrative (for example, the order of the LS and ID fields might be permuted, one placed after the other before the data "payload", after the payload, and so forth).

Assuming that multiple BS transmit an ID signal simultaneously, a standard SFN UE would receive the superimposition of these signals, and would be unable to decode anything. With the introduction of orthonormal weighting factors, the UE is able not only to extract the CIR of each BS, but also any sequence transmitted by each BS. Thus, the weighting uniquely enables the extraction of the IDs from each BS. This extraction of distinct signals transmitted by each BS is not done in a standard FSN, since only the "mixture" (i.e. the superimposition of all signals from all BSs) is decoded as a whole.

This field is also weighted by the same "m" factor that is applied to all samples of a frame (e.g., $m_{11}$ for Frame i of $BS_1$, $m_{12}$ for Frame i of $BS_2$, and so forth).

It is noted that blocks of four (4) frames are used as the basis of the matrix multiplication in the embodiment of FIG. 4C; i.e., Frames i through i+3 are multiplied by matrices $m_{ix}$ through $m_{4x}$, respectively, and then this pattern is repeated for the next block of four frames, and so forth. However, other numbers of frames and block architectures may be used consistent with the present invention. Moreover, different numbers of base stations may be used as well.

Figure 4D:
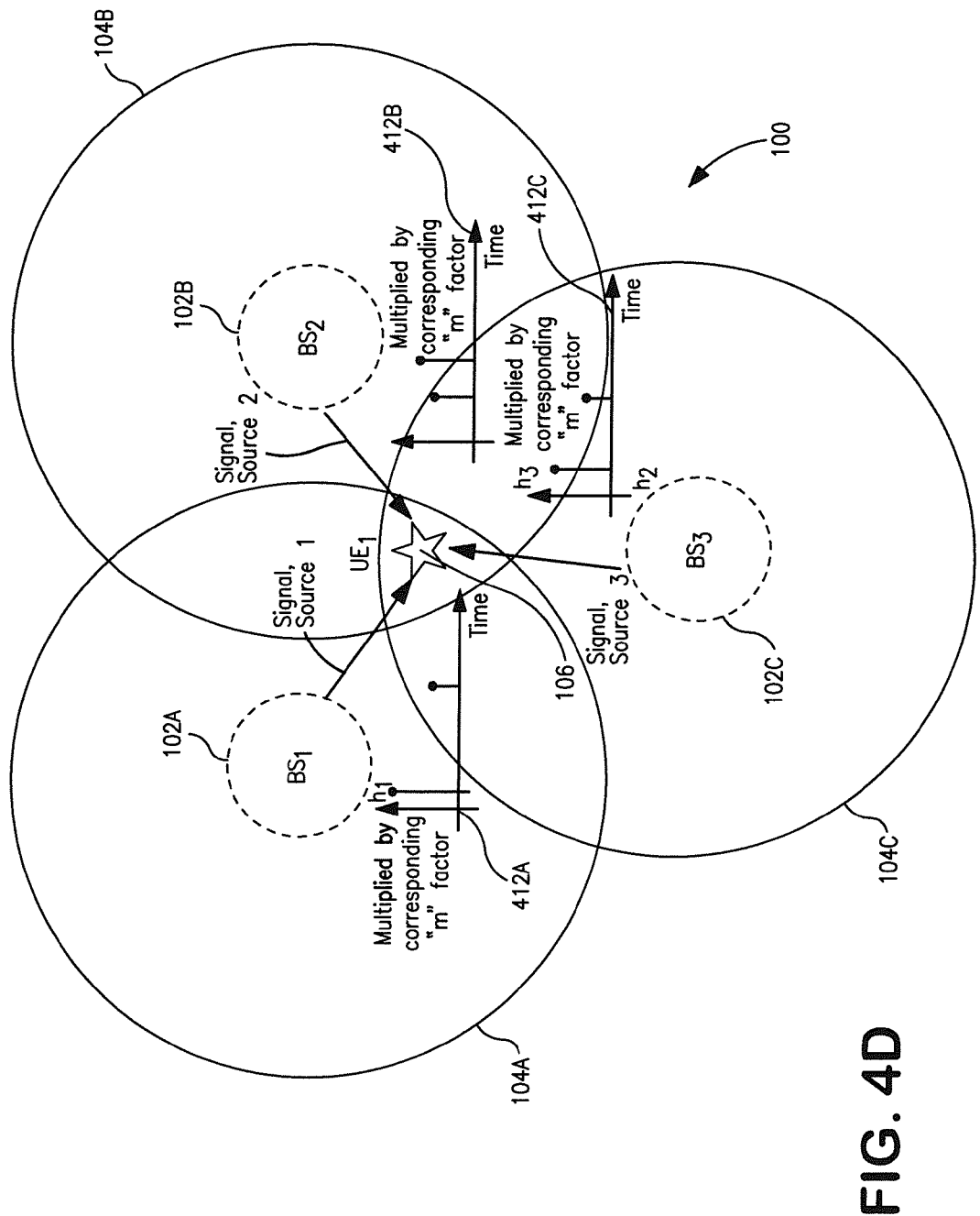
FIG. 4D is a graphical illustration of the resultant vectors transmitted from the base station with orthogonal weighting vectors in accordance with the principles of the present invention.

FIG. 4D shows the resulting new vectors transmitted from the base stations 412A, 412B, and 412C, with orthogonal weighting vectors derived from the matrix $M_4$ 406.

Exemplary User Equipment Reception—

At the receiving UE, the properties of the weighting matrix are exploited to distinctly identify each BS. Recalling that the exemplary weighting matrix is orthonormal, assuming that the U×1 vector $v_a$ contains the Learning Sequence (LS) and/ or "BS ID" sequences transmitted by BS number a (it is independent of frame number i, since it is assumed to be always the same content). Then, one received block (as illustrated in FIG. 4C) is expressed in FIG. 4A 408 where $v_{tot,i}$ is the total received signal vector for frame number i and $H_a$ is the circulant channel convolution matrix representing the channel between BS 102 number a (the aggregate representation of BSs 102A, 102B, and 102C) and the UE 106 and ⊗ is the Kronecker Matrix multiplication operator.

In the illustrated embodiment, the UE 106 retrieves the matrix M and its corresponding transpose $M^H$ coefficients, at a prior time (via transmission from the BS), or locally (for the Walsh-Hadamard matrix $M_4$, the coefficients may be calculated, or hardcoded within memory). Using the aforementioned property of orthonormal matrices of Eqn. (2) (i.e., $M \cdot M^H = N \cdot I$), the following relationship is obtained:

$$(M \otimes I_U)^H \cdot (M \otimes I_U) = N \cdot I_{NU} \qquad \text{Eqn. (4)}$$

Therefore, the UE may use simple linear operations well known in the digital signal processing arts to multiply the received bundle of vectors $v_{tot,i}$ by $(M \otimes I_U)^H$ as shown in FIG. 4A (see element 410). More succinctly, the UE may derive the unique ID from the various BS $v_a$ convolved by their corresponding circulant channel convolution $H_a$ response.

The path information obtained from the foregoing process is then used to calculate location estimation based on transmission latency estimation, DoA estimation, power estimation, angle of arrival, time of arrival, etc.

In the simplest case, the difference in transmission latency (e.g., time of transmission or receipt) between each received channel can be used to calculate distance between the user equipment and the base station. Based on collective distances between known base station coordinates, the user equipment can calculate its location using triangulation techniques as previously described. Additional information relating to each base station, such as DoA and power estimation, may be used to further improve location accuracy. Furthermore, the multiple base station reception also improves accuracy.

Unlike a standard SFN that utilizes an "observed" addition of all communication channel impulse responses, the modified SFN "observes" signals corresponding to an addition of all impulse responses, which are additionally weighted by the orthonormal M factors described above. As weighting does not change the demodulation techniques necessary for decoding the data stream, typical channel estimation techniques within each frame are sufficient for demodulation. Therefore, standard cellular operation advantageously does not require any knowledge about the weighted configuration of the SFN, thereby having negligible impact on legacy device configuration and operation.

Furthermore, assuming that the enabled UE only uses the LS of a single frame in order to perform the channel estimation, no modification in the receiver architecture is required.

Additionally, it is expected that the weighting metric of the illustrated embodiment will not lead to any performance degradation. Rather, some additional diversity is introduced, which will typically lead to some performance gains. As in typical diversity operation, if one configuration (i.e., one given weighting of frames) leads to destructive interference of the transmitted signals at the receiver location, the change of the M matrix codes at the next frame may lead to constructive interference. In this operation, the varying weighting operations may be handled within the UE in a manner similar to changing diversity paths. Ideally, the data should be distributed (e.g., by an interleaver or other such mechanism) over multiple frames in order to obtain the maximum diversity gain, although this is not a requirement of practicing the invention.

Theoretically, the channel is not allowed to change considerably over "N" symbols, thus in this disclosed mode of operation, the channels need to remain approximately constant or quasi-static over a minimum duration of N frames (i.e., corresponding to a low relative velocity between UE and BS). This is not a significant disability, however, since most location estimation services would be utilized for a slowly moving or virtually static receiver (e.g., fixed user, or mobile user not moving at a high rate of speed). Furthermore, in current OFDM systems, the channel is unlikely to change over quite a large number of OFDM symbols; however in certain implementations this may not be true. Consequently, the present invention contemplates the use of logic which determines whether sufficiently slow movement of the UE is occurring for a good channel path estimation to be obtained; if not, the determination is deferred for a number of frames or blocks until such opportunity is available.

As previously stated, unlike typical SFN operation, the ID of each BS is different. Therefore, for a single-source decoder, only one corresponding ID and channel can be calculated each iteration. To identify the minimal four BSs (e.g., $BS_1$-$B_4$ in FIG. 4C), four iterations would be necessary. In one variant, inexpensive logic is implemented within the UE processing in order to perform multiple channel calculations in parallel. Yet other channel processing approaches will be recognized by those of ordinary skill given the present disclosure as well.

For applications of relatively sedentary or invariant nature, the repeating nature of the weighting may be used. For example, each subsequent path characteristic can be calculated at a leisurely rate (taking N*X frames where X is an integer).

It is also noted that UE devices within the network that are not required to or interested in determining UE location need not decode and extract the extra information relating to BS identification and path parameters. These UE simply interpret the received signals as a "single source" signal as in the prior art approach, and perform an independent CIR estimation for each frame.

It will further be recognized that the foregoing exemplary weighting and embedded ID scheme can be considered to be a "mode switch" of sorts. The LS is received in "legacy" mode, i.e. the UE has no knowledge whether it is originating from a single source or multiple sources (the decoding is identical in both cases). The UE performs operations on the LS sequences in order to obtain the signals which have been sent from the various distinct BS—this can be seen as a "non-legacy" mode. After this, however, the UE continues decoding the frame in "legacy" mode, i.e. the superimposed signals originating from distinct BS are decoded as such (without any separation of the signals). Stated differently, the UE sees all the base stations in the legacy mode as a single source, yet resolves them into individual entities (multi-source) in the non-legacy mode.

It will also be noted that the unique identification of the various base stations may be used for both (i) dynamic selection of base stations from a plurality of possible choices during non-legacy mode operation (e.g. for the separation of the LS sequences from distinct BS) and (ii) use for purposes other than UE location estimation. Specifically, the ability to uniquely identify base stations with which the UE interacts allows for, inter alia, selection of one base station (or group of base stations) over another during non-legacy mode operation. For instance, in one variant, individual ones of a "pool" of Q base stations (Q being greater than the minimum number of base stations needed to resolve location) are evaluated and selected for use based on their individual properties or performance. These properties may include for example channel quality, loading, or any number of different metrics which might make one base station more desirable for use with a given UE at that particular moment. This selection can be applied dynamically for location estimation, such as where the "weaker" station(s) or those with excessive multipath or fading effects are replaced with better stations.

It will further be noted that while the Walsh-Hadamard weighting (or similar) is applied to the LS part only in various embodiments described herein (thus allowing a separation of the LS sequences from all contributing BS) and not the data part, the same operation can optionally be introduced in at least parts of the data portion of the frame. A possible drawback of this latter (optional) approach would be that the level of redundancy is increased (i.e., the same data symbols need to be repeated and weighted with the Walsh-Hadamard or similar coefficients); however, the UE would also then have the ability to select a subset of base stations whose transmitted signals it wants to take into account for the decoding process.

Similarly, the geographic position of the various stations may be considered in terms of accuracy or ability to render location estimation. For instance, in the "corner case" of all four stations ($BS_1$-$BS_4$) in the prior example being substantially co-linear or on the same geographic line as each other, the position accuracy or resolution would be poor or ineffective, where as replacing even one of these stations with another (non co-linear) station would greatly enhance or enable location determination. Furthermore as the UE can estimate the power of the various BS signals after signal separation, a weighted consideration of the location data from the various BS may be taken into account for the final location estimation. Such a method may weight poor signals so they have less influence compared to strong signals, thus improving overall location estimation accuracy.

Aside from position location, the ability to resolve the signal of each different base station can also be used to enhance system operation. For instance, under the prior art, all signals from multiple base stations in the SFN are effectively added and appear as a single source as previously described. Hence, if the resultant signal is poor, the UE has no way of knowing which of the base stations is causing the problems (e.g., its timing or frequency reference might be off, component failed, etc.). By being able to extract or "tease out" the signal component of each individual station, the UE and/or network operator can remove or compensate for the offending station(s), and substitute another station as required.

Moreover, it will be appreciated that the multi-station approach described herein can be applied even to networks that characteristically operate only one-to-one links (i.e., one BS communicating with one UE). Specifically, such networks can be modified for a "many-to-one" mode wherein multiple bases stations transmit the same data frames to the UE (with proper synchronization), and based on weighting of the data and base station identifications embedded in the frames, enable triangulation or position location of the UE. This many-to-one mode could be selectively invoked; e.g., only when an application running on the UE makes a call for location information, at which point an upstream request message is generated and sent to a base station, thereby causing other stations in proximity thereto to establish links with the UE for at least a period of time. Furthermore, the UE can "recommend" BS (by using their corresponding IDs) to be used for such a selectively invoked transmission. The UE can thus exploit its knowledge about the signal quality from various BS (e.g. from the last separation of LS sequences and the corresponding estimation of channel coefficients).

Special Case: not Enough M Codes—

Figure 5A:
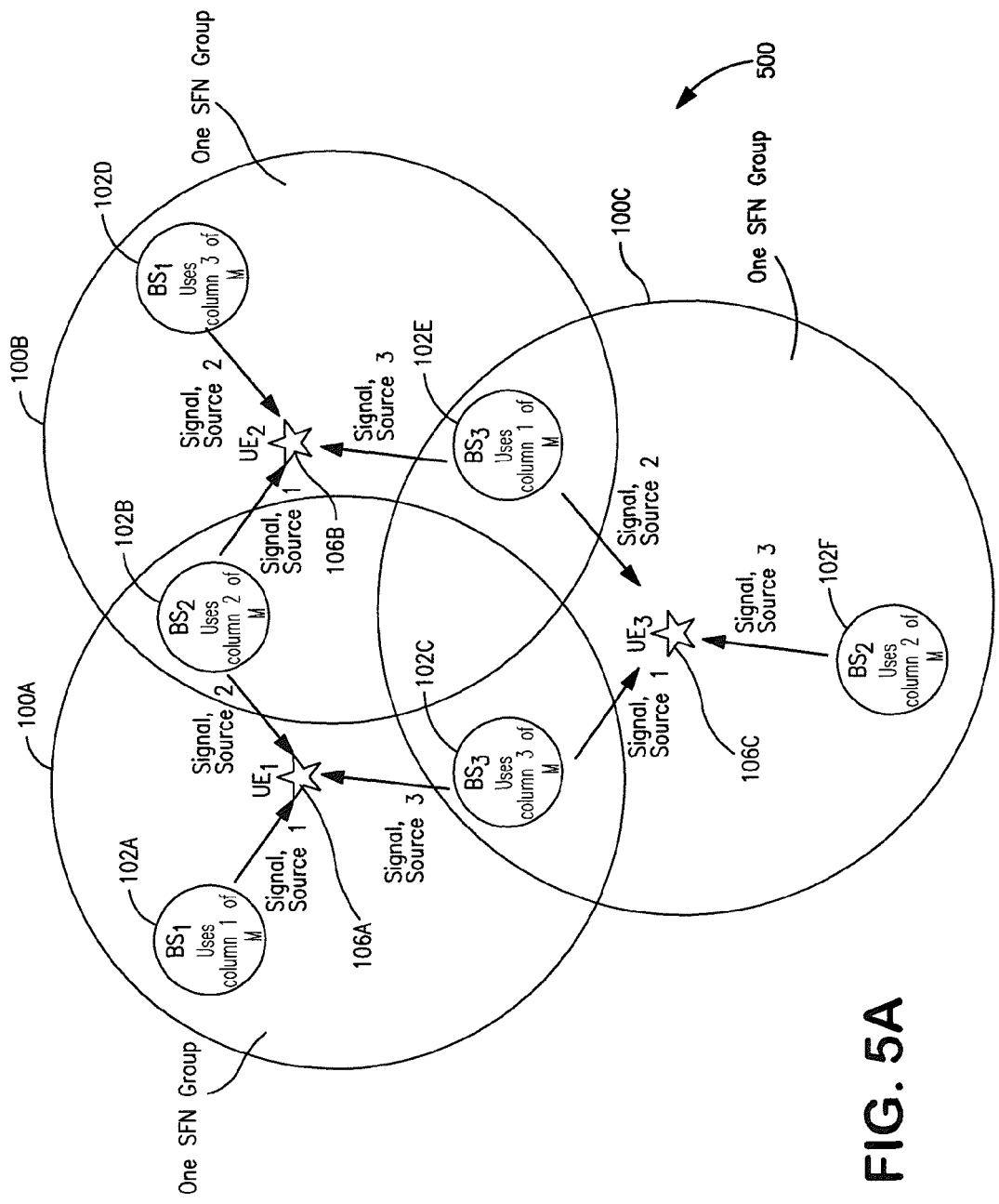
FIG. 5A illustrates a system comprising multiple single frequency networks (SFNs) operating concurrently in accordance with the present invention.

One requirement implicit to the present invention is the unique identification of the base stations by each UE wishing to perform location estimation. Referring to FIG. 5A, multiple SFNs operating concurrently are shown. The ideal case 500 is illustrated where multiple BS operating with multiple UE pose no confusion. In SFN 100A, BS 102A is operating using column one of Walsh-Hadamard matrix M, BS 102B uses column two of matrix M, and BS 102C uses column three of matrix M. SFN 100A singularly serves UE 106A.

Likewise, in SFN 100B, BS 102E is operating using column one of Walsh-Hadamard matrix M, BS 102B uses column two of matrix M, and BS 102D uses column three of matrix M. SFN 100B singularly serves UE 106B. Note that BS 102B, which is assigned to column two of matrix M, serves both 106A and 106B.

Finally, in SFN 100C, BS 102E is operating using column one of Walsh-Hadamard matrix M, BS 102F uses column two of matrix M, and BS 102C uses column three of matrix M. SFN 100C singularly serves UE 106C.

Unfortunately, an ideal distribution such as that of FIG. 5A may not always be possible. For example, FIG. 5B demonstrates a system with a comparatively poor distribution 550. UE 106 is being served by BS 102G, 102H, 102I, and 102J, 102G and 102H both are using column three of the Walsh-Hadamard matrix M, making them indistinguishable from one another.

Figure 5B:
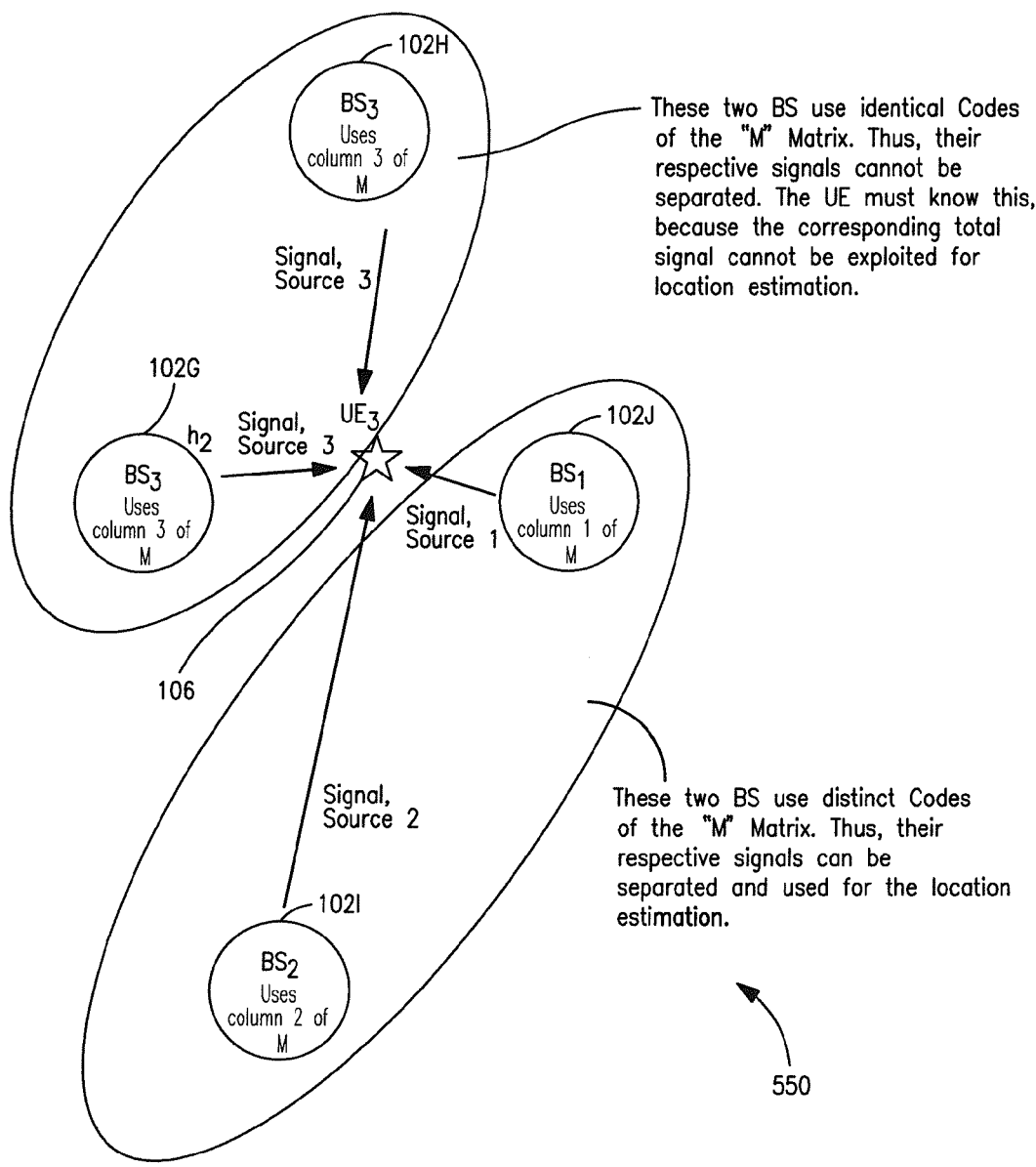
FIG. 5B illustrates a system with multiple SFNs having uneven distributions operating concurrently in accordance with the principles of the present invention.

The simplest and least intrusive solution to the problem presented by FIG. 5B would be to increase the size of orthonormal matrix M. For each M size increase, a corresponding increase in the number of available codes is increased. In certain implementations, this may be undesirable. As previously noted, Walsh-Hadamard matrix generation scales according to the rule $N=2^X$ where X is a positive real integer value. For the marginal addition of one (1) to the value of X, the matrix scales exponentially both in capability, and subsequent processing complexity (recall that for N codes, N frames must be processed). In the aforementioned exemplary contention between BS 102G and BS 102H, BS 102H may be reassigned column four of the up-scaled Walsh-Hadamard matrix. Simplicity is one chief benefit of the Walsh-Hadamard family of matrices; but in certain implementations other matrices may be used. Such matrices may not exponentially scale. For example, in the case of Fourier matrices, any positive integer "N" matrix size is feasible.

It will be appreciated that the foregoing solution of increasing matrix size may also be applied selectively or even dynamically; i.e., only when required. For instance, an $N=2^X$ size matrix can be applied when no ambiguity such as that of FIG. 5B exists, and an up-scaled matrix applied in cases where ambiguity arises, such as where a base station experiences component or power failure, or other operational factors such as UE location/service conspire to create the ambiguity. In this fashion, the processing overhead and complexity added by the up-scaled matrix size are only utilized when absolutely needed. For Walsh-Hadamard matrices, the up-scaling would need to be exponential (e.g. $N=2^X \rightarrow N=2^{X+1}$). However, for other matrix types, such as Fourier matrices for example, it is possible upscale only marginally (e.g. $N=2^X \rightarrow N=2^X+1$).

Another solution to the foregoing problem requires that some base stations use the same code. In this case, these stations use a standard-SFN-transmission approach (e.g., that of FIG. 4B), and their respective signals cannot be separated at the UE receiver. In one embodiment, the re-used codes are signaled to the UE (e.g., via downlink message or other such mechanism), since the UE can only use the other M codes which uniquely identify one single transmitting BS in order to perform location estimation. Even so, the SFN portion of the "twin" or ambiguous BSs may still be used and demodulated by the UE. Proper allocation and re-use of certain codes within the network (i.e., with respect to particular base stations located in particular geographic areas) permit such code re-use consistent with also allowing for UE location estimation. Specifically, as long as a given UE is aware of the code re-use (via the aforementioned signaling) or does not come in contact with base stations using the same code at the same time, location estimation may proceed. In cases where the UE is exposed to "twin" codes, the UE must take such ambiguity into account for location estimation.

In the aforementioned exemplary contention between 102G and 102H (FIG. 5B), the UE 106 would necessarily disregard path information from both of the twin/ambiguous BS. Unfortunately, in this exemplary case, the remaining two base stations 102I and 102J do not provide sufficient information to the UE to complete location determination to the desired level of accuracy; i.e., a spatial ambiguity will be created, since the path information from the two viable BS will yield two possible locations for the UE. Hence, an additional path or other mechanism to resolve the spatial ambiguity is required. Such other mechanisms or paths may be available to the UE (e.g., prior association with or proximity to another BS may be used to resolve the spatial ambiguity). Moreover, the device may have a movement sensor (such as an acceleration sensor) which could be used to refine location estimation if the BS based information is ambiguous.

In another solution, a "NULL" code is always reserved within the matrix. Depending on the population of BS and their relative positions, a subset of the BSs is enabled to transmit orthogonal M codes, while the remaining BSs transmit a common "NULL" code. When the UE characterizes each BS, it does not characterize any BS using the "NULL" code. In the aforementioned example, 102G would switch over to a "NULL" code, removing contention with 102H. In clarification, the "NULL" code is a reserved code of the "Walsh Hadamard", "Fourier" or similar matrix (i.e. the NULL code is simply a "name" reserved for one valid code. It does not modify the original matrix).

Furthermore, while each BS ID is required to uniquely identify the BS to the UE, it is not required that the BS ID remain consistent for all UE. In one variant, a control signal link between the UE and BS is used to notify the various affected BS when the UE detects an M code contention (large differences in received multi-paths would indicate multiple BS using the same M code). The BS network may then internally negotiate the corresponding M codes.

Exemplary UE Apparatus—

Figure 6A:
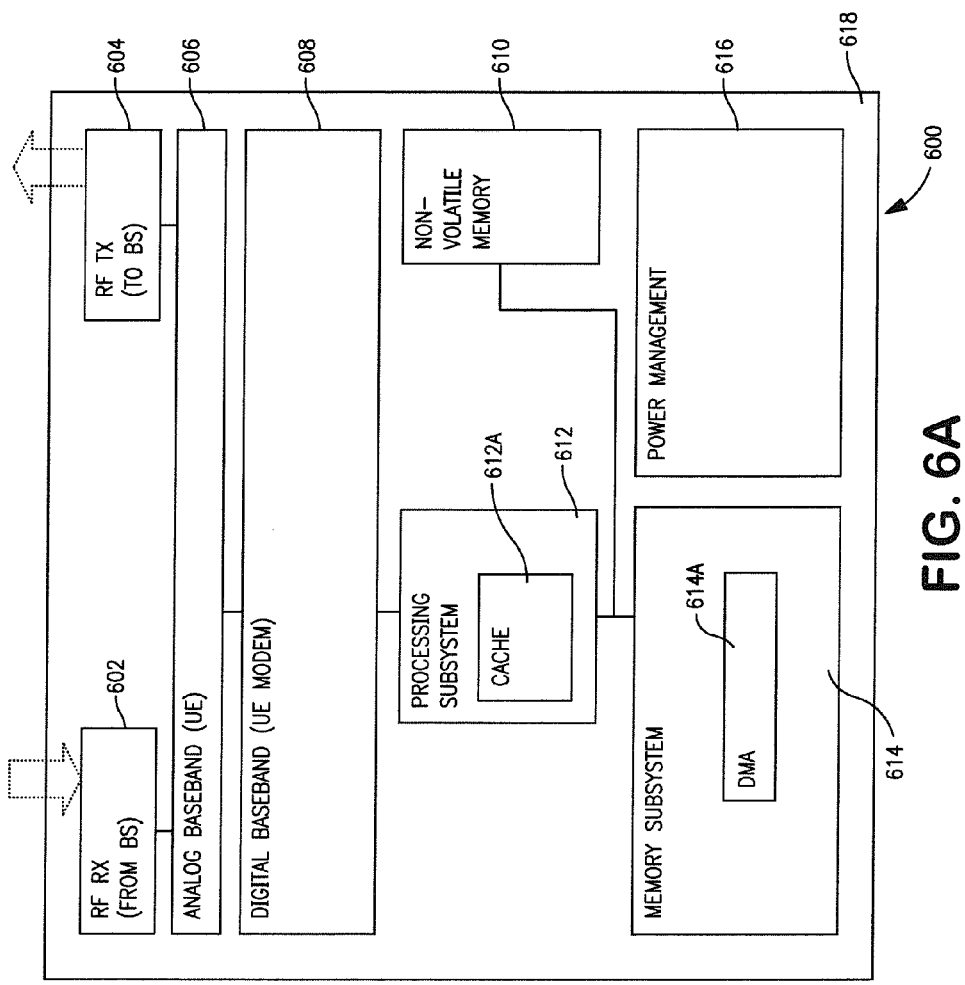
FIG. 6A is a block diagram illustrating exemplary client apparatus according to one embodiment of the present invention.

FIG. 6A illustrates an exemplary client or UE apparatus 600 useful in implementing the methods of the present invention. The apparatus disclosed comprises, inter alfa, a UE such as a cellular telephone, smartphone, portable computer, or other mobile communications device capable of operating within an SFN.

The illustrated UE apparatus 600 comprises an application processor subsystem 612 such as a digital signal processor, microprocessor, field-programmable gate array, or plurality of processing components mounted on one or more substrates 618. The processing subsystem may also comprise an internal cache memory 612A. The processing subsystem 612 is connected to a memory subsystem comprising memory 614 which may for example, comprise SRAM, FLASH and SDRAM components. The memory subsystem may implement one or a more of DMA type hardware 614A, so as to facilitate data accesses as is well known in the art.

The radio/modem subsystem comprises a digital baseband 608, analog baseband 606, RX frontend 602 and TX frontend 604. While specific architecture is discussed, in some embodiments, some components may be obviated or may otherwise be merged with one another (such as RF RX, RF TX and ABB combined, as of the type used for 3G digital RFs) as would be appreciated by one of ordinary skill in the art given the present disclosure.

The Analog Baseband 606 controls operation of the radio frontends and converts a digital signal (input from the digital baseband modem 608) to an analog representation for transmission. Therefore, the digital baseband modem loads the analog baseband, with scheduling parameters for the upcoming frame. The control of TX and RX frontends are also controlled by the analog baseband 606.

The illustrated power management subsystem (PMS) 616 provides power to the UE, and may comprise an integrated circuit and or a plurality of discrete electrical components. In one exemplary portable UE apparatus, the power management subsystem advantageously interfaces with a battery.

The UE 600 further includes algorithms (whether rendered as software, firmware, or even hardware implementations) operative to implement the location estimation methodologies previously described herein with respect to FIGS. 3A and 4A-4D. For example, in one variant, the UE 600 includes software coded to run on the UE's DSP to perform the necessary matrix operations, BS identification, path data extraction, and location estimation (e.g., triangulation) for the UE.

The UE may also be configured to support the network-based location determination approach described herein (see, e.g., the method of FIG. 3C). This may require for example algorithms and supporting protocols which extract the necessary identification and path parameter information, and package this data for transmission back to the base station(s).

The UE 600 may also include one or more other air interfaces, such as a PAN interface (e.g., Bluetooth), a WLAN interface (e.g., WiFi), or another cellular interface (e.g., 3GPP/UMTS).

Exemplary Serving Base Station Apparatus—

Figure 6B:
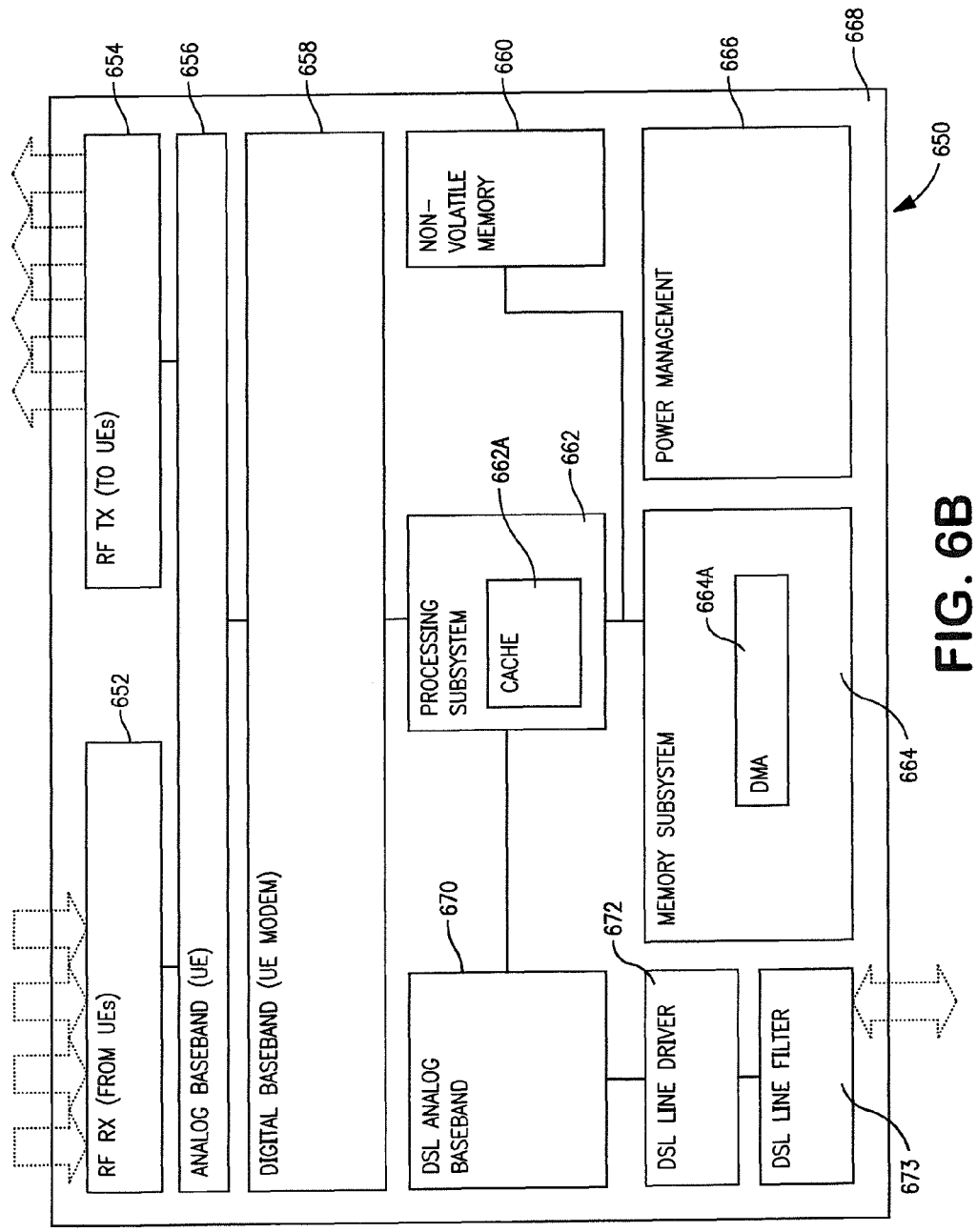
FIG. 6B is a block diagram illustrating exemplary serving base station apparatus according to one embodiment of the present invention.

Referring now to FIG. 6B, exemplary serving base station apparatus 650 useful in implementing the methods of the present invention are illustrated. The base station apparatus 650 comprises in one variant a computerized device (e.g., server, such as in the form of a stand-alone device, blade, or card) having one or more substrate(s) 668. The substrate(s) further include a plurality of integrated circuits including a processing subsystem 662 such as a digital signal processor (DSP), microprocessor, gate array, or plurality of processing components as well as a power management subsystem 666 that provides power to the base station 650.

The embodiment of the apparatus 650 shown in FIG. 6B at a high level comprises a broadcasting circuit configured to broadcast within an SFN, including switching between many-to-one and one-to-one modes as applicable. The broadcasting subsystem comprises a digital baseband 658, analog baseband 656, and RF components for RX 652 and TX 654.

The processing subsystem 662 may comprise a plurality of processors (or multi-core processor(s)). Additionally, the processing subsystem also comprises a cache 662A to facilitate processing operations. In the disclosed invention, weighting and insertion of the unique identifier may be implemented in software, firmware or hardware which is coupled to the processing subsystem. Alternatively, in another variant, the operations may be directly performed at the radio subsystem.

The processing subsystem 662 is in data communication with a memory subsystem 664. The memory subsystem comprises a direct memory access (DMA) 664A. Additionally the non-volatile memory 660 may be incorporated within the memory subsystem 664, or be separated (as shown).

The apparatus 650 also preferably implements a network interface (e.g. IPsec VPN tunnel or the like) to the core network. In one embodiment, this is accomplished via a wireline broadband access subsystem (e.g., a DSL connection, T1 line, DOCSIS cable modem, ISDN, etc.). This may comprise an analog baseband 670, a line driver 672, and a line filter 673. Alternatively, the network interface may be wireless in nature, such as a broadband WiFi or WiMAX interface, millimeter wave system, satellite link, etc.

Methods of Doing Business—

In another aspect of the invention, methods of doing business based on the foregoing location estimation capabilities are disclosed.

In one embodiment, the method comprises first providing to a user or network subscriber a location determination-enabled device (e.g., 4G "smartphone"), the device adapted to triangulate its position with respect to a Single Frequency Network (SFN). The device is then enabled to transmit to an access network a physical coordinate determined, at least in part, by triangulating its relative position to the radio access network. Subsequent transmissions from the radio access network to the device may comprise data received from an application server or other entity having location specific content, and data additionally enabling the device to target its behavior to a desired location-specific application (e.g. road or travel directions, advertisements for businesses within physical proximity, etc.). The network operator may charge an additional premium for these features (unlimited use), or provide them as an incentive or as part of a premium subscription package. Alternatively, the network operator may impose a per-use or similar billing paradigm if desired. The information for both the businesses and/or corresponding navigational data may be subsidized by the participating businesses as well, thereby generating revenue for the network operator.

Time of day or network operation considerations may also be included within the billing or subscription model; e.g., use during peak periods or other periods when the network is heavily loaded may command a premium over those during other times. Similarly, the level of precision and/or location where the services are requested may be differentiated; e.g., more precision might be available or necessary within a metropolitan area having a comparatively high density of base stations, versus that for a rural area (where less spatial/geographic ambiguity might arise, and hence need for less precision). For example, a user wishing to locate their position to find nearby Italian restaurants within New York City may require greater precision than in a more rural area, where the density of restaurants is far less.

In another embodiment, the method comprises using the UE or mobile device to transmit its derived location information for use by another entity (e.g., location monitoring service, etc.). These transmissions of location data (which may comprise either "raw" parametric data from which a relative and ultimately absolute location estimate may be derived, or the actual derived estimated location itself) can be generated according to any number of different models, including e.g.: (i) upon a specific request from a network or location determination entity (such as via a "location update request" or similar message); (ii) periodically (e.g., every hour); or (iii) anecdotally (e.g., upon the occurrence of a certain event, such as the UE being powered up, the UE registering within the network, the UE crossing a geographic or service boundary, the UE invoking an application running thereon that requires such location data, etc.

The UE accordingly may also act somewhat as a "machine to machine" or M2M device in this regard, depending on its configuration (and in fact may specifically be configured as such, for example for use on a fleet vehicle). See, e.g., co-owned and co-pending U.S. patent application Ser. No. 12/231,095 filed Aug. 29, 2008 and entitled "METHODS AND APPARATUS FOR MACHINE-TO-MACHINE BASED COMMUNICATION SERVICE CLASSES", which is incorporated herein by reference in its entirety, for one exemplary approach to M2M communications and associated business models useful with the present invention.

In another exemplary embodiment, a tourist that is traveling in an unfamiliar area and having a location-enabled client device (e.g., cellular telephone) may opt to transmit a multimedia stream having a physical coordinate for later use or reference. The location enabled device, having determined its physical location, transmits a multimedia stream to a centralized server and/or its physical location, thereby enabling the tourist a running account of his travels, as well as possible running publication to friends and family. The multimedia stream, and/or running publication application may be provided free to the subscriber as an incentive, or command a premium.

It will also be appreciated that the methods and apparatus described herein, by allowing for UE position estimation via no hardware upgrades and limited software modifications to extant infrastructure and the UE, also provide an intrinsic cost benefit over prior art position location technologies such as UPS. Specifically, by obviating a separate GPS receiver, some of the cost and complexity associated with such devices can be avoided, and the device made simpler and "thinner". The resulting device may also be more power efficient, since no GPS receiver module need be supported electrically.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of broadcasting signals within a wireless Single Frequency Network (SFN), the method comprising:
    at a plurality of transmitters:
    receiving from a mobile device a location request for the location of the mobile device;
    weighting at least a portion of payload data based on an orthogonal matrix, wherein said weighting introduces additional diversity into the payload data;
    embedding the payload data with unique transmitter-identification information for each of said plurality of transmitters and with location-related parameters of the mobile device; and
    transmitting the weighted and embedded payload data from the plurality of transmitters to the mobile device in response to the location request.

2. The method of claim 1, wherein said SFN comprises a WiMAX (IEEE Std. 802.16) compliant network.

3. The method of claim 1, wherein said transmitter-identification information is adapted so that the mobile device, responsive to receiving said payload data transmitted from said plurality of transmitters, can uniquely resolve said transmitter-identification information from said payload data.

4. The method of claim 3, further comprising using said unique resolution of said transmitter-identification information for performing a location determination of the mobile device.

5. The method of claim 1, wherein the payload data further comprises an identical data stream from each of said plurality of transmitters.

6. The method of claim 4, wherein the mobile device is configured to process at least one of: (i) the weighted payload data; and/or (ii) weighted base station identification information.

7. The method of claim 6, wherein:
    the weighted payload data is derived from the data transmitted from the plurality of transmitters to the mobile device; and
    the weighted base station identification information is derived from the unique transmitter-identification information for each of said plurality of transmitters.

8. The method of claim 1, wherein the SFN comprises a 3GPP LTE-Advanced-complaint network.

9. The method of claim 1, wherein the SFN comprises a network complaint with IEEE Std. comprising at least one of: (i) IEEE-STd. 802.11n; and (ii) IEEE-Std. 802.11VHT (Very High Throughput).

10. A wireless device, comprising:
    a wireless interface configured to receive wireless data from one or more transmitters in a Single Frequency Network (SFN); and
    a digital processor, in data communication with the wireless interface, the digital processor configured to run a computer program thereon, the computer program comprising a plurality of instructions configured to, when executed by the digital processor:
    monitor one or more predetermined criteria to enable a location determination functionality;
    when the one or more predetermined criteria is met, send a request for location determination of said wireless device, the request configured to enable the location determination functionality;
    extract weighted payload data for each of said one or more transmitters from the wireless data, wherein the weighted payload data is weighted based on an orthogonal matrix and introduces additional diversity into the payload data;
    extract location-related parameters of the wireless device and unique transmitter-identification data for each of said one or more transmitters from the wireless data, where the location-related parameters and the transmitter-identification data are embedded into a portion of the wireless data in response to the enabled location determination functionality; and
    based on the extracted weighted payload data and transmitter-identification data, calculate a geographic position of the wireless device.

11. The wireless device of claim 10, wherein the Single Frequency Network comprises a WiMAX-compliant network.

12. The wireless device of claim 10, wherein the Single Frequency Network comprises a 3GPP LTE-Advanced-compliant network.

13. The wireless device of claim 10, wherein the wireless data comprises synchronization data, the synchronization data comprising data repeated across one or more transmitters.

14. The wireless device of claim 13, wherein the synchronization data comprises a learning sequence, and the transmitter-identification data comprises base station identification information.

15. The wireless device of claim 13, wherein the plurality of instructions are further configured to, when executed by the digital processor, determine a location of the wireless device based at least in part on (i) the transmitter-identification data and (ii) the synchronization data.

* * * * *